United States Patent
Wang et al.

(10) Patent No.: US 11,503,484 B2
(45) Date of Patent: Nov. 15, 2022

(54) MEASUREMENT METHOD AND APPARATUS

(71) Applicant: HUAWEI TECHNOLOGIES CO., LTD., Guangdong (CN)

(72) Inventors: Hong Wang, Beijing (CN); Jian Zhang, Shenzhen (CN); Li Chai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/991,297

(22) Filed: Aug. 12, 2020

(65) Prior Publication Data
US 2020/0374719 A1   Nov. 26, 2020

Related U.S. Application Data

(63) Continuation of application No. PCT/CN2018/076569, filed on Feb. 12, 2018.

(51) Int. Cl.
  *H04W 24/04*  (2009.01)
  *H04W 36/30*  (2009.01)
(52) U.S. Cl.
  CPC .......... *H04W 24/04* (2013.01); *H04W 36/30* (2013.01)
(58) Field of Classification Search
  CPC .............................. H04W 24/04; H04W 36/30
  (Continued)

(56) References Cited

U.S. PATENT DOCUMENTS 8,423,019 B2   4/2013   Rao
9,042,852 B1   5/2015   Gauba
(Continued)

FOREIGN PATENT DOCUMENTS

CN   102647767 A   8/2012
CN   102740381 A   10/2012
(Continued)

OTHER PUBLICATIONS

3GPP TS 36.133 V14.6.0(Dec. 2017),3rd Generation Partnership Project, Technical Specification Group Radio Access Network,Evolved Universal Terrestrial Radio Access (E-UTRA),Requirements for support of radio resource management(Release 14), 2965 pages.
(Continued)

*Primary Examiner* — Joel Ajayi
(74) *Attorney, Agent, or Firm* — Fish & Richardson P.C.

(57) ABSTRACT

This application provides a measurement method and apparatus, and relates to the field of communications technologies. The method includes: measuring a currently camped cell in Δt, to obtain $\{S_i | i$ is a positive integer, $i \leq N\}$; if any $S_i$ in $\{S_i | i$ is a positive integer, $i \leq N\}$ satisfies that $S_{REF} - S_i$ greater than or equal to a first threshold, updating $S_{REF}$ so that $S_{REF}$ is equal to $S_N$; and measuring one or more neighboring cells of the currently camped cell if $S_{REF} - S_i$ is greater than or equal to the first threshold. To be specific, when determining that a cell state variable in Δt is always less than a cell state reference variable, a terminal may start measurement on the neighboring cells, and update the cell state variable from $S_{REF}$ to a cell state variable $S_N$ obtained through the last measurement in Δt.

14 Claims, 8 Drawing Sheets

(58) Field of Classification Search
USPC ......................................................... 455/436
See application file for complete search history.

(56) References Cited

U.S. PATENT DOCUMENTS

| | | | |
|---|---|---|---|
| 9,698,278 B2 | 7/2017 | Jiang | |
| 2009/0286542 A1* | 11/2009 | Roberts | H04W 48/18 455/436 |
| 2010/0150011 A1 | 6/2010 | Kitaji | |
| 2012/0069756 A1 | 3/2012 | Ji et al. | |
| 2014/0315555 A1 | 10/2014 | Zhang et al. | |
| 2016/0066255 A1* | 3/2016 | Marinier | H04W 48/16 370/350 |
| 2016/0100351 A1 | 4/2016 | Yang et al. | |

FOREIGN PATENT DOCUMENTS

| | | |
|---|---|---|
| CN | 104365132 A | 2/2015 |
| CN | 104969618 A | 10/2015 |
| CN | 106358251 A | 1/2017 |
| CN | 107277845 A | 10/2017 |
| CN | 107295558 A | 10/2017 |
| CN | 107426764 A | 12/2017 |
| JP | 2006352883 A | 12/2006 |
| JP | 2009077368 A | 4/2009 |
| JP | 2017510207 A | 4/2017 |

OTHER PUBLICATIONS

GPP TS 36.304 V14.5.0 (Dec. 2017),3rd Generation Partnership Project,Technical Specification Group Radio Access Network,Evolved Universal Terrestrial Radio Access (E-UTRA), User Equipment (UE) procedures in idle mode (Release 14), 49 page.
3GPP TS 36.331 V15.0.1 (Jan. 2018), 3rd Generation Partnership Project,Technical Specification Group Radio Access Network,Evolved Universal Terrestrial Radio Access (E-UTRA), Radio Resource Control (RRC),Protocol specification (Release 15), 170 pages.
Ericsson, "Email report 99bis_35 Relaxed Monitoring",3GPP TSG-RAN2 Meeting #100,R2-1713010,Reno, US, Nov. 27-Dec. 13, 2017, 15 page.
PCT International Search Report and Written Opinion in International Application No. PCT/CN2018/076,569, dated Nov. 1, 2018, 16 pages (With English Translation).
3GPP TS 38.304 v0.0.7 (Jan. 2018), "3rd Generation Partnership Project; Technical Specification Group Radio Access Network; New Generation Radio Access Network; User Equipment (UE) procedures in Idle mode (Release 15)," Jan. 2018, 12 pages.
3GPP TS 38.133 V15.0.0 (Dec. 2017), "3rd Generation Partnership Project; Technical Specification Group Radio Access Network; NR; Requirements for support of radio resource management(Release 15)," Dec. 2017, 41 pages.
3GPP TS 38.331 V15.0.0 (Dec. 2017), 3rd Generation Partnership Project; Technical Specification Group Radio Access Network NR Radio Resource Control (RRC) protocol specification(Release 15), Dec. 2017, 188 pages.
Extended European Search Report issued in European Application No. 18904690.7 dated Dec. 15, 2020, 10 pages.
Office Action issued in Chinese Application No. 201880088987.3 dated Jan. 19, 2021, 16 pages (with English translation).
Office Action issued in Japanese Application No. 2020-542972 dated Aug. 24, 2021, 5 pages (with English translation).
Office Action issued in Chinese Application No. 201880088987.3 dated May 18, 2022, 4 pages.

* cited by examiner

MEASUREMENT METHOD AND APPARATUS

CROSS-REFERENCE TO RELATED APPLICATIONS

This application is a continuation of International Application No. PCT/CN2018/076569, filed on Feb. 12, 2018, the disclosure of which is hereby incorporated by reference in its entirety.

TECHNICAL FIELD

This application relates to the field of communications technologies, and in particular, to a measurement technology.

BACKGROUND

In a communications system such as a long term evolution (Long Term Evolution, LTE) system and a fifth-generation mobile communications technology (5th-Generation, 5G) system, communication signal coverage is usually performed in a cell. A cell with a relatively large communication signal coverage area may be referred to as a macro cell, and a cell with a relatively small communication signal coverage area may be referred to as a micro cell. The micro cell and the macro cell may be deployed on different frequencies, or may be deployed on a same frequency. When a terminal is to select a cell to camp on, the terminal may select a cell by measuring signal quality of cells on different frequencies.

In a related technology, when camping on a cell, a terminal may receive a threshold that is used to start measurement and that is broadcast or sent by a base station serving the currently camped cell, and start measurement on a neighboring cell of the currently camped cell when it is learned, through measurement, that signal quality or signal power of the currently camped cell is less than the threshold. In this case, if the threshold is relatively small, the terminal cannot start measurement on the neighboring cell in time, and consequently cannot reselect to a cell with better signal quality in time. If the threshold is relatively large, the terminal starts measurement at a relatively early occasion, increasing measurement power consumption of the terminal.

SUMMARY

To resolve a problem in a related technology that timeliness is poor if a start occasion is excessively late and power consumption of a terminal is relatively high if a start occasion is excessively early when the terminal starts cell measurement based on a threshold, this application provides a measurement method and apparatus, and a computer storage medium. Technical solutions are as follows:

According to a first aspect, a measurement method is provided, where the method includes:

measuring a currently camped cell in $\Delta t$, to obtain $\{S_i | i \text{ is a positive integer}, i \leq N\}$, where N is a total quantity of times of measuring the currently camped cell in $\Delta t$, and $S_i$ is a cell state variable obtained through the $i^{th}$ measurement; and if any $S_i$ in $\{S_i | i \text{ is a positive integer}, i \leq N\}$ satisfies that $S_{REF} - S_i$ is greater than or equal to the first threshold, updating $S_{REF}$ so that $S_{REF}$ is equal to $S_N$, where $S_{REF}$ is a cell state reference variable of the currently camped cell; and measuring one or more neighboring cells of the currently camped cell if $S_{REF} - S_i$ is greater than or equal to the first threshold.

In this embodiment of this application, when determining that the cell state variable in $\Delta t$ is always less than the cell state reference variable, a terminal may start measurement on the neighboring cells, and update the cell state variable from $S_{REF}$ to a cell state variable $S_N$ obtained through the last measurement in $\Delta t$. In this way, if the terminal fails to reselect to another cell after measuring the neighboring cells, the terminal may determine again, based on $S_{REF}$ obtained after the update, whether the cell state variable of the currently camped cell in $\Delta t$ meets a condition, to determine whether to start measurement on the neighboring cells again. Compared with a case in which the terminal continuously measures the neighboring cells, this application reduces a quantity of times of measuring the neighboring cells by the terminal, and reduces power consumption of the terminal.

Optionally, the method further includes: receiving, from a network device, information used to indicate $\Delta t$ or information used to indicate the first threshold.

Optionally, the method further includes: obtaining $S_{REF}$ after reselecting or selecting to the currently camped cell.

The terminal may obtain $S_{REF}$ from the network device; or may measure a cell state variable of the currently camped cell at a moment at which the terminal camps on the currently camped cell, and determine the measured cell state variable as $S_{REF}$; or may determine, as $S_{REF}$, a cell state variable of the currently camped cell that is obtained through the latest (or latest) measurement performed before a moment at which the terminal camps on the currently camped cell.

Optionally, the cell state variable includes signal power RSRP or signal quality RSRQ.

Optionally, a coverage area of each of one or more cells in the neighboring cells is larger than a coverage area of the currently camped cell.

Optionally, the method further includes:

if a first cell in the neighboring cells meets a cell reselection condition, reselecting to the first cell.

The cell reselection condition may be: a coverage area of a cell is greater than the coverage area of the currently camped cell, and signal quality or signal power of the cell is greater than a third threshold.

Optionally, the method further includes:

sending a measurement report to the network device, where the measurement report includes signal quality RSRQ or signal power RSRP of each of the one or more cells.

A terminal in connected mode may send a measurement report to the network device after measuring the neighboring cells, so that the network device performs cell handover for the terminal based on the signal quality or the signal power that is of each of the one or more cells and that is included in the measurement report.

Optionally, the method further includes:

if a priority of a frequency of each of the one or more cells is lower than a priority of a frequency of the currently camped cell, the coverage area of each of the one or more cells is larger than the coverage area of the currently camped cell; or if a priority of each of the one or more cells is lower than a priority of the currently camped cell, the coverage area of each of the one or more cells is larger than the coverage area of the currently camped cell; or if a frequency of each of the one or more cells is lower than a frequency of the currently camped cell, the coverage area of each of the one or more cells is larger than the coverage area of the currently camped cell; or if a cell type of each of the one or more cells is a macro cell, and a cell type of the currently camped cell is a micro cell, the coverage area of each of the one or more cells is larger than the coverage area of the currently camped cell.

According to a second aspect, a measurement method is provided, where the method includes:

measuring a currently camped cell to obtain a current cell state variable $S_{current}$;

if $S_{current}-S_{REF}$ is greater than or equal to a second threshold, updating $S_{REF}$ so that $S_{REF}$ is equal to $S_{current}$, where $S_{REF}$ is a cell state reference variable of the currently camped cell; and measuring one or more neighboring cells of the currently camped cell if $S_{REF}-S_{current}$ is greater than or equal to the first threshold.

Optionally, the method further includes:

receiving, from a network device, a message used to indicate the second threshold or a message used to indicate the first threshold.

Optionally, the method further includes: obtaining $S_{REF}$ after a terminal reselects or selects to the currently camped cell.

The terminal may obtain $S_{REF}$ from the network device; or may measure a cell state variable of the currently camped cell at a moment at which the terminal camps on the currently camped cell, and determine the measured cell state variable as $S_{REF}$; or may determine, as $S_{REF}$, a cell state variable of the currently camped cell that is obtained through the latest (or latest) measurement performed before a moment at which the terminal camps on the currently camped cell.

Optionally, the cell state variable includes signal power RSRP or signal quality RSRQ.

Optionally, a coverage area of each of one or more cells in the neighboring cells is larger than a coverage area of the currently camped cell.

Optionally, the method further includes:

if a first cell in the neighboring cells meets a cell reselection condition, reselecting to the first cell.

The cell reselection condition may be: a coverage area of a cell is greater than the coverage area of the currently camped cell, and signal quality or signal power of the cell is greater than a third threshold.

Optionally, the method further includes:

sending a measurement report to the network device, where the measurement report includes signal quality RSRQ or signal power RSRP of each of the one or more cells.

A terminal in connected mode may send a measurement report to the network device after measuring the neighboring cells, so that the network device performs cell handover for the terminal based on the signal quality or the signal power that is of each of the one or more cells and that is included in the measurement report.

Optionally, the method further includes:

if a priority of a frequency of each of the one or more cells is lower than a priority of a frequency of the currently camped cell, the coverage area of each of the one or more cells is larger than the coverage area of the currently camped cell; or if a priority of each of the one or more cells is lower than a priority of the currently camped cell, the coverage area of each of the one or more cells is larger than the coverage area of the currently camped cell; or if a frequency of each of the one or more cells is lower than a frequency of the currently camped cell, the coverage area of each of the one or more cells is larger than the coverage area of the currently camped cell; or if a cell type of each of the one or more cells is a macro cell, and a cell type of the currently camped cell is a micro cell, the coverage area of each of the one or more cells is larger than the coverage area of the currently camped cell.

According to a third aspect, a measurement method is provided, where the method includes:

measuring a currently camped cell in $\Delta t$, to obtain $\{S_i | i$ is a positive integer, $i \leq N\}$, where N is a total quantity of times of measuring the currently camped cell in $\Delta t$, and $S_i$ is a cell state variable obtained through the $i^{th}$ measurement;

updating $S_{REF}$ so that $S_{REF}$ is equal to a maximum value in $\{S_i | i$ is a positive integer, $i \leq N\}$ or is equal to an average value of $\{S_i | i$ is a positive integer, $i \leq N\}$, where $S_{REF}$ is a cell state reference variable of the currently camped cell; and measuring one or more neighboring cells of the currently camped cell if $S_{REF}-S_i$ is greater than or equal to a first threshold.

Optionally, the method further includes: receiving, from a network device, information used to indicate $\Delta t$ or information used to indicate the first threshold.

Optionally, the method further includes: obtaining $S_{REF}$ after a terminal reselects or selects to the currently camped cell.

The terminal may obtain $S_{REF}$ from the network device; or may measure a cell state variable of the currently camped cell at a moment at which the terminal camps on the currently camped cell, and determine the measured cell state variable as $S_{REF}$; or may determine, as $S_{REF}$, a cell state variable of the currently camped cell that is obtained through the latest (or latest) measurement performed before a moment at which the terminal camps on the currently camped cell.

Optionally, the cell state variable includes signal power RSRP or signal quality RSRQ.

Optionally, a coverage area of each of one or more cells in the neighboring cells is larger than a coverage area of the currently camped cell.

Optionally, the method further includes:

if a first cell in the neighboring cells meets a cell reselection condition, reselecting to the first cell.

The cell reselection condition may be: a coverage area of a cell is greater than the coverage area of the currently camped cell, and signal quality or signal power of the cell is greater than a third threshold.

Optionally, the method further includes:

sending a measurement report to the network device, where the measurement report includes signal quality RSRQ or signal power RSRP of each of the one or more cells.

A terminal in connected mode may send a measurement report to the network device after measuring the neighboring cells, so that the network device performs cell handover for the terminal based on the signal quality or the signal power that is of each of the one or more cells and that is included in the measurement report.

Optionally, the method further includes:

if a priority of a frequency of each of the one or more cells is lower than a priority of a frequency of the currently camped cell, the coverage area of each of the one or more cells is larger than the coverage area of the currently camped cell; or if a priority of each of the one or more cells is lower than a priority of the currently camped cell, the coverage area of each of the one or more cells is larger than the coverage area of the currently camped cell; or if a frequency of each of the one or more cells is lower than a frequency of the currently camped cell, the coverage area of each of the one or more cells is larger than the coverage area of the currently camped cell; or if a cell type of each of the one or more cells is a macro cell, and a cell type of the currently camped cell is a micro cell, the coverage area of each of the one or more cells is larger than the coverage area of the currently camped cell.

According to a fourth aspect, a measurement method is provided, where the method includes:

determining whether a variation $\Delta S_{\Delta t_1}$ of a cell state variable in first duration $\Delta t_1$ is greater than or equal to a first threshold; and measuring signal quality RSRQ or signal power RSRP of one or more first cells in one or more neighboring cells of a currently camped cell if $\Delta S_{\Delta t_1}$ is greater than or equal to the first threshold.

The first duration $\Delta t_1$ may be any duration. In this case, the first duration may not exist. In other words, the first duration is optional.

Optionally, information indicating $\Delta t_1$ or the first threshold is received from a network device.

Information indicating only $\Delta t_1$ may be received from the network device, or information indicating only the first threshold may be received, or information indicating $\Delta t_1$ and the first threshold may be received.

Optionally, $\Delta S_{\Delta t_1} = |S_{t_{REF}} - S_{t_{REF}+\Delta t_1}|$, where $S_{t_{REF}}$ is a cell state variable of the currently camped cell at a reference time point $t_{REF}$, $S_{t_{REF}+\Delta t_1}$ is a cell state variable of the currently camped cell at $t_{REF}+\Delta t_1$, and the cell state variable includes signal power RSRP or signal quality RSRQ.

Optionally, $t_{REF}$ is a moment at which a terminal camps on the currently camped cell; or $t_{REF}$ is a moment at which $S_{t_{REF}}$ is updated.

Optionally, the method further includes:

starting a first timer if $\Delta S_{\Delta t_1}$ is greater than or equal to the first threshold, where running duration of the first timer is second duration $\Delta t_2$;

measuring the currently camped cell in $\Delta t_2$, to obtain $\{S_i | i$ is a positive integer, $i \leq N\}$, where N is a total quantity of times of measuring the currently camped cell in $\Delta t_2$, and $S_i$ is a cell state variable obtained through the $i^{th}$ measurement; and if any $S_i$ in $\{S_i | i$ is a positive integer, $i \leq N\}$ satisfies that $|S_{t_{REF}} - S_i|$ is greater than or equal to the first threshold, updating $S_{t_{REF}}$ so that $S_{t_{REF}}$ is equal to $S_N$.

Optionally, $\Delta S_{\Delta t_1}$ is a quantity of changed cells on which the terminal camps in $\Delta t_1$.

Optionally, a coverage area of the first cell is larger than a coverage area of the currently camped cell.

The method further includes:

reselecting to a second cell if the one or more first cells include a cell whose signal quality RSRQ or signal power RSRP is greater than or equal to a third threshold, where the second cell is a first cell whose signal quality RSRQ or signal power RSRP is greater than or equal to the third threshold in the one or more first cells.

Optionally, a coverage area of the first cell is larger than a coverage area of the currently camped cell.

The method further includes:

sending a measurement report to the network device, where the measurement report includes signal quality RSRQ or signal power RSRP of each of the one or more first cells.

Optionally, that a coverage area of the first cell is larger than a coverage area of the currently camped cell is represented as follows:

a priority of a frequency of the first cell is lower than a priority of a frequency of the currently camped cell; or a priority of the first cell is lower than a priority of the currently camped cell; or a frequency of the first cell is lower than a frequency of the currently camped cell; or a cell type of the first cell is a macro cell, and a cell type of the currently camped cell is a micro cell.

According to a fifth aspect, a measurement method is provided, where the method includes:

if a variation $\Delta S$ of a cell state variable is greater than or equal to a first threshold, determining whether duration $\Delta t_{\Delta S}$ for reaching $\Delta S$ is less than or equal to a second threshold; and measuring signal quality RSRQ or signal power RSRP of one or more first cells in one or more neighboring cells of a currently camped cell if $\Delta t_{\Delta S}$ is less than or equal to the second threshold.

Optionally, information indicating the first threshold or the second threshold is received from a network device.

Information indicating only the first threshold may be received from the network device, or information indicating only the second threshold may be received, or information indicating the first threshold and the second threshold may be received.

Optionally, $\Delta S = |S_{t_{REF}} - S_{t_{REF}+\Delta t_{\Delta S}}|$, where $S_{t_{REF}}$ is a cell state variable of the currently camped cell at a reference time point $t_{REF}$, $S_{t_{REF}+\Delta t_{\Delta S}}$ is a cell state variable of the currently camped cell at $t_{REF}+\Delta t_{\Delta S}$, and the cell state variable includes signal power RSRP or signal quality RSRQ.

Optionally, $t_{REF}$ is a moment at which a terminal camps on the currently camped cell; or $t_{REF}$ is a moment at which $S_{t_{REF}}$ is updated.

Optionally, the method further includes:

starting a first timer if $\Delta_{t_{\Delta S}}$ is less than or equal to the second threshold, where running duration of the first timer is second duration $\Delta t_2$;

measuring the currently camped cell in $\Delta t_2$, to obtain $\{S_i | i$ is a positive integer, $i \leq N\}$, where N is a total quantity of times of measuring the currently camped cell in $\Delta t_2$, and $S_i$ is a cell state variable obtained through the $i^{th}$ measurement; and if any $S_i$ in $\{S_i | i$ is a positive integer, $i \leq N\}$ satisfies that $|S_{t_{REF}} - S_i|$ is greater than or equal to the first threshold, updating $S_{t_{REF}}$ so that $S_{t_{REF}}$ is equal to $S_N$.

Optionally, a coverage area of the first cell is larger than a coverage area of the currently camped cell.

The method further includes:

reselecting to a second cell if the one or more first cells include a cell whose signal quality RSRQ or signal power RSRP is greater than or equal to a third threshold, where the second cell is a first cell whose signal quality RSRQ or signal power RSRP is greater than or equal to the third threshold in the one or more first cells.

Optionally, a coverage area of the first cell is larger than a coverage area of the currently camped cell.

The method further includes:

sending a measurement report to the network device, where the measurement report includes signal quality RSRQ or signal power RSRP of each of the one or more first cells.

Optionally, that a coverage area of the first cell is larger than a coverage area of the currently camped cell is represented as follows:

a priority of a frequency of the first cell is lower than a priority of a frequency of the currently camped cell; or a priority of the first cell is lower than a priority of the currently camped cell; or a frequency of the first cell is lower than a frequency of the currently camped cell; or a cell type of the first cell is a macro cell, and a cell type of the currently camped cell is a micro cell.

According to a sixth aspect, a measurement apparatus is provided. The measurement apparatus has a function of implementing behavior in the measurement method in the first aspect, the second aspect, the third aspect, the fourth aspect, or the fifth aspect. The measurement apparatus includes at least one module, and the at least one module is configured to implement the measurement method provided in the first aspect, the second aspect, the third aspect, the fourth aspect, or the fifth aspect.

According to a seventh aspect, a measurement apparatus is provided. A structure of the measurement apparatus includes a processor and a memory. The memory is configured to store a program that supports the measurement apparatus in performing the measurement method provided in the first aspect, the second aspect, the third aspect, the fourth aspect, or the fifth aspect, and store data used to implement the measurement method provided in the first aspect, the second aspect, the third aspect, the fourth aspect, or the fifth aspect. The processor is configured to execute the program stored in the memory. An operation apparatus of the storage device may further include a communications bus, and the communications bus is configured to establish a connection between the processor and the memory.

In an optional design, the memory may be disposed outside the measurement apparatus. That is, the measurement apparatus includes the processor. The processor is configured to: couple to the memory, and read and execute an instruction in the memory, to implement one or more of the methods in the foregoing aspects.

According to an eighth aspect, a computer-readable storage medium is provided. The computer-readable storage medium stores an instruction. When the instruction is run on a computer, the computer is enabled to perform the measurement method according to the first aspect, the second aspect, the third aspect, the fourth aspect, or the fifth aspect.

According to a ninth aspect, a computer program product including an instruction is provided. When the computer program product runs on a computer, the computer is enabled to perform the measurement method according to the first aspect, the second aspect, the third aspect, the fourth aspect, or the fifth aspect.

The technical solutions provided in this application bring the following beneficial effects:

The currently camped cell is measured in $\Delta t$, to obtain $\{S_i | i \text{ is a positive integer, } i \leq N\}$, where N is the total quantity of times of measuring the currently camped cell in $\Delta t$, and $S_i$ is the cell state variable obtained through the $i^{th}$ measurement. If any $S_i$ in $\{S_i | i \text{ is a positive integer, } i \leq N\}$ satisfies that $S_{REF}-S_i$ is greater than or equal to the first threshold, $S_{REF}$ is updated so that $S_{REF}$ is equal to $S_N$, where $S_{REF}$ is the cell state reference variable of the currently camped cell. The neighboring cells of the currently camped cell are measured if $S_{REF}-S_i$ is greater than or equal to the first threshold. That is, in the embodiments of this application, when determining that the cell state variable in $\Delta t$ is always less than the cell state reference variable, the terminal may start measurement on the neighboring cells, and update the cell state variable from $S_{REF}$ to the cell state variable $S_N$ obtained through the last measurement in $\Delta t$. In this way, if the terminal fails to reselect to another cell after measuring the neighboring cells, the terminal may determine again, based on $S_{REF}$ obtained after the update, whether the cell state variable of the currently camped cell in $\Delta t$ meets a condition, to determine whether to start measurement on the neighboring cells again. Compared with a case in which the terminal continuously measures the neighboring cells, this application reduces a quantity of times of measuring the neighboring cells by the terminal, and reduces power consumption of the terminal.

DESCRIPTION OF EMBODIMENTS

Figure 1A:
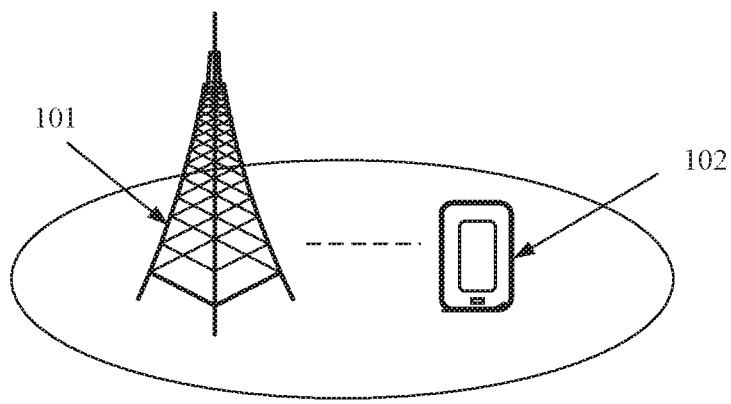
FIG. 1A is a diagram of a system architecture for a measurement method according to an embodiment of this application.

To make the objectives, technical solutions, and advantages of this application clearer, the following further describes the embodiments of this application in detail with reference to the accompanying drawings.

An application scenario of the embodiments of this application is first described before the embodiments of this application are described in detail.

In a communications system such as an LTE system and a 5G system, communication signal coverage is usually performed in a cell. A cell with a relatively large communication signal coverage area may be referred to as a macro cell, and a cell with a relatively small communication signal coverage area may be referred to as a micro cell. When a terminal in idle mode is to camp on a cell, the terminal may reselect, by measuring signal quality of cells on different frequencies, to a cell to camp on. A terminal in connected mode may be handed over to camped-on cells on different frequencies as appropriate also by measuring signal quality of the cells. A measurement method provided in the embodiments of this application may be used b a terminal to perform cell measurement as appropriate, and perform cell reselection or cell handover based on a measurement result.

Specifically, the measurement method provided in the embodiments of this application may be applied to the following several specific scenarios.

Scenario 1: A micro cell and a macro cell are deployed on different frequencies, and different priorities are set for the different frequencies. For example, a priority of a frequency on which the micro cell is located is higher than a priority of a frequency on which the macro cell is located. In this scenario, when a terminal in idle mode is in a moving state, or when a terminal in idle mode is in a static state and there is a moving object blocking the terminal, the terminal frequently changes a camped-on micro cell because of a small coverage area of the micro cell. In this process, measurement is frequently started, increasing power consumption of the terminal. Therefore, the measurement method provided in the embodiments of this application may be used to measure a neighboring cell, to select, based on a measurement result, an appropriate cell to camp on (for example, camping on a macro cell, where because a coverage area of the macro cell is larger, a frequency of changing a camped-on cell by the terminal in the moving state is lower than a frequency of changing a camped-on cell when the terminal camps on a micro cell). In this way, a frequency of updating a camped-on cell and power consumption of the terminal are reduced. When a terminal in connected mode is in a moving state, or when a terminal in connected mode is in a static state and there is a moving object blocking the terminal, the measurement method provided in the embodiments of this application may also be used to measure a neighboring cell, and then handover to an appropriate cell is performed based on a reported measurement result (for example, camping on a macro cell, where because a coverage area of the macro cell is larger, a frequency at which the terminal in the moving state is handed over to a camped-on cell is lower than a frequency at which the terminal is handed over to a camped-on cell when the terminal camps on a micro cell). In this way, a frequency of changing a serving cell, that is, a quantity of handovers, is reduced, and power consumption of the terminal is reduced.

Scenario 2: A micro cell and a macro cell are deployed on a same frequency, a same priority is set for the same frequency, and signal quality or signal power of the micro cell is better than signal quality or signal power of the macro cell. In this scenario, when a terminal in idle mode is in a moving or static state, or when a terminal in idle mode is in a static state and there is a moving object blocking the terminal, the terminal reselects to a micro cell because of better signal quality of the micro cell. Based on this, the terminal frequently changes a camped-on micro cell because of a small coverage area of the micro cell. In this process, measurement is frequently started, increasing power consumption of the terminal. Therefore, the measurement method provided in the embodiments of this application may be used to measure a neighboring cell, to select, based on a measurement result, an appropriate cell to camp on (for example, camping on a macro cell, where because a coverage area of the macro cell is larger, a frequency of changing a camped-on cell by the terminal in the moving state is lower than a frequency of changing a camped-on cell when the terminal camps on a micro cell). In this way, a frequency of updating a camped-on cell and power consumption of the terminal are reduced. When a terminal in connected mode is in a moving or static state, or when a terminal in connected mode is in a static state and there is a moving object blocking the terminal, the measurement method provided in the embodiments of this application may also be used to measure a neighboring cell, and then handover to an appropriate cell is performed based on a reported measurement result (for example, camping on a macro cell, where because a coverage area of the macro cell is larger, a frequency of changing a camped-on cell by the terminal in the moving state is lower than a frequency of changing a camped-on cell when the terminal camps on a micro cell). In this way, a frequency of changing a serving cell, that is, a quantity of handovers, is reduced, and power consumption of the terminal is reduced.

A system architecture used in the embodiments of this application is described below.

FIG. 1A is a diagram of a system architecture for a measurement method according to an embodiment of this application. As shown in FIG. 1A, the system architecture may include a base station 101 and a terminal 102. A signal coverage area of the base station 101 is a cell corresponding to the base station 101. The terminal 102 may be a terminal in idle mode that camps on the cell corresponding to the base station 101, or may be a terminal that has established a communication connection to the base station 101.

It should be noted that the base station 101 may be an evolved NodeB (E-UTRAN Node B, eNB), or may be a next-generation NodeB (next generation Node B, gNB) in a 5G communications system.

Figure 1B:
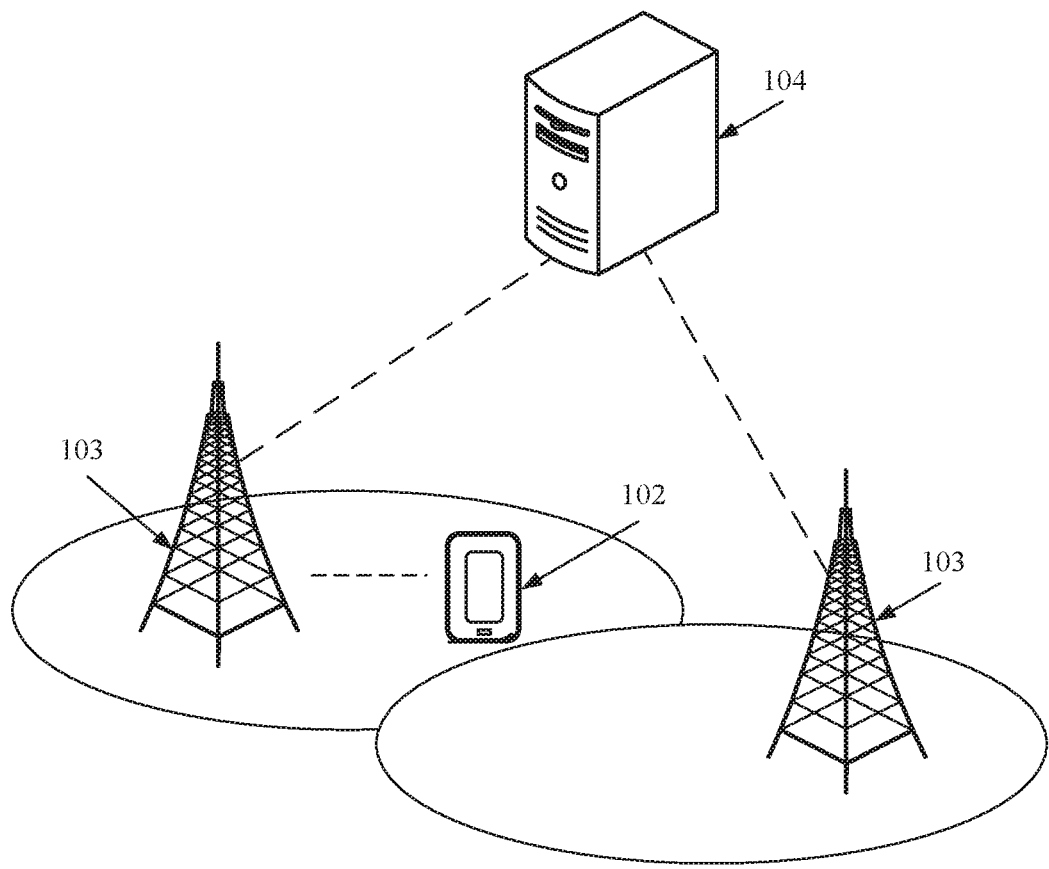
FIG. 1B is a diagram of a system architecture for another measurement method according to an embodiment of this application.

Optionally, in a possible implementation, the base station in the foregoing system architecture may exist virtually. That is, as shown in FIG. 1B, some functions of the base station in the foregoing system architecture may be deployed on a distributed unit 103 (Distributed Unit, DU), and some functions may be deployed on a centralized unit (Centralized Unit, CU) 104. A base station in each cell may be replaced with a DU 103, and a plurality of DUs 103 may be connected to one CU 104.

Figure 2:
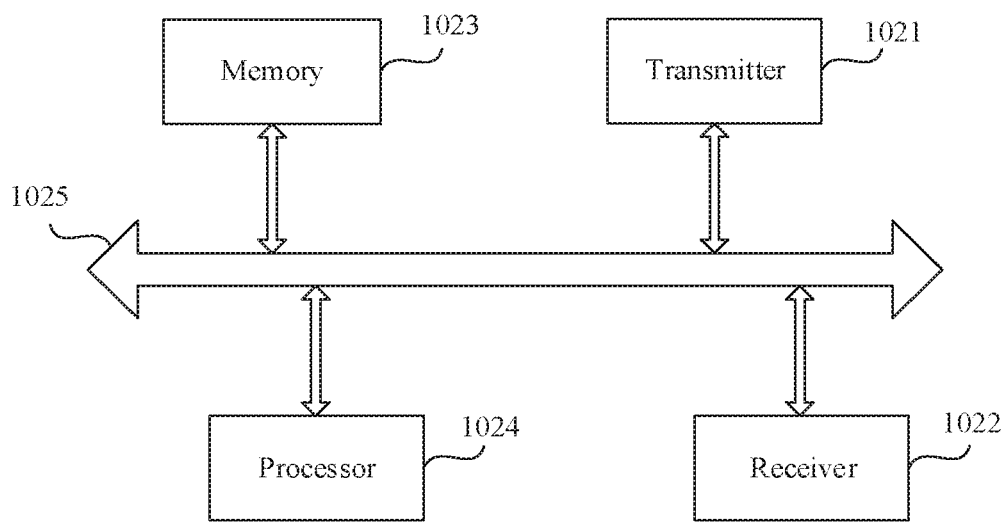
FIG. 2 is a schematic structural diagram of a terminal according to an embodiment of this application.

FIG. 2 is a schematic structural diagram of a terminal 102 according to an embodiment of this application. The terminal 102 may be a mobile phone, a tablet computer, or the like. The terminal 102 mainly includes a transmitter 1021, a receiver 1022, a memory 1023, a processor 1024, and a communications bus 1025. A person skilled in the art may understand that a structure of the terminal 102 shown in FIG. 2 does not constitute a limitation on the terminal 102, and the terminal 102 may include more or fewer components than those shown in the figure, or combine some components, or have different component arrangements. This is not limited in this embodiment of this application.

The transmitter 1021 may be configured to send data and/or signaling to the base station 101. The receiver 1022 may be configured to receive data and/or signaling sent by the base station 101.

The memory 1023 may be configured to store data sent by the base station 101, and the memory 1023 may be further configured to store one or more running programs and/or modules configured to perform the measurement method provided in the embodiments of this application. The memory 1023 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, optical disc storage (including a compact optical disc, a laser disc, an optical disc, a digital versatile disc, a Blu-ray disc, or the like), or a magnetic disk storage medium, another magnetic storage device, or any other medium that can be configured to carry or store expected program code in a form of an instruction or a data structure and that can be accessed by a computer, but is not limited thereto. The memory 1023 may exist independently and is connected to the processor 1024 via the communications bus 1025. The memory 1023 may alternatively be integrated with the processor 1024.

The processor 1024 is a control center of the terminal 102. The processor 1024 may be a general-purpose central processing unit (Central Processing Unit, CPU), a microprocessor, an application-specific integrated circuit (Application-Specific Integrated Circuit, ASIC), or one or more integrated circuits that are configured to control program execution of the solutions. The processor 1024 may run or execute a software program and/or a module stored in the memory 1023, and invoke data stored in the memory 1013, to implement the measurement method provided in the embodiments of this application.

In addition, the processor 1024 and the memory 1023 may transmit information via the communications bus 1025.

In addition, the embodiments of this application further provide a structure of the base station 101. Specifically, the base station 101 mainly includes five components: a transmitter, a receiver, a memory, a processor, and a communications bus. A person skilled in the art may understand that the foregoing structure of the base station 101 does not constitute a limitation on the base station 101, and the base station 101 may include more or fewer components than the five components, or combine some components, or combine some components, or have different component arrangements. This is not limited in the embodiments of this application.

Functions of the transmitter, the receiver, the memory, the processor, and the communications bus of the base station 101 are the same as functions of the transmitter, the receiver, the memory, the processor, and the communications bus of the terminal 102 in FIG. 2. Details are not described herein again.

The following describes in detail the measurement method provided in the embodiments of this application.

Figure 3:
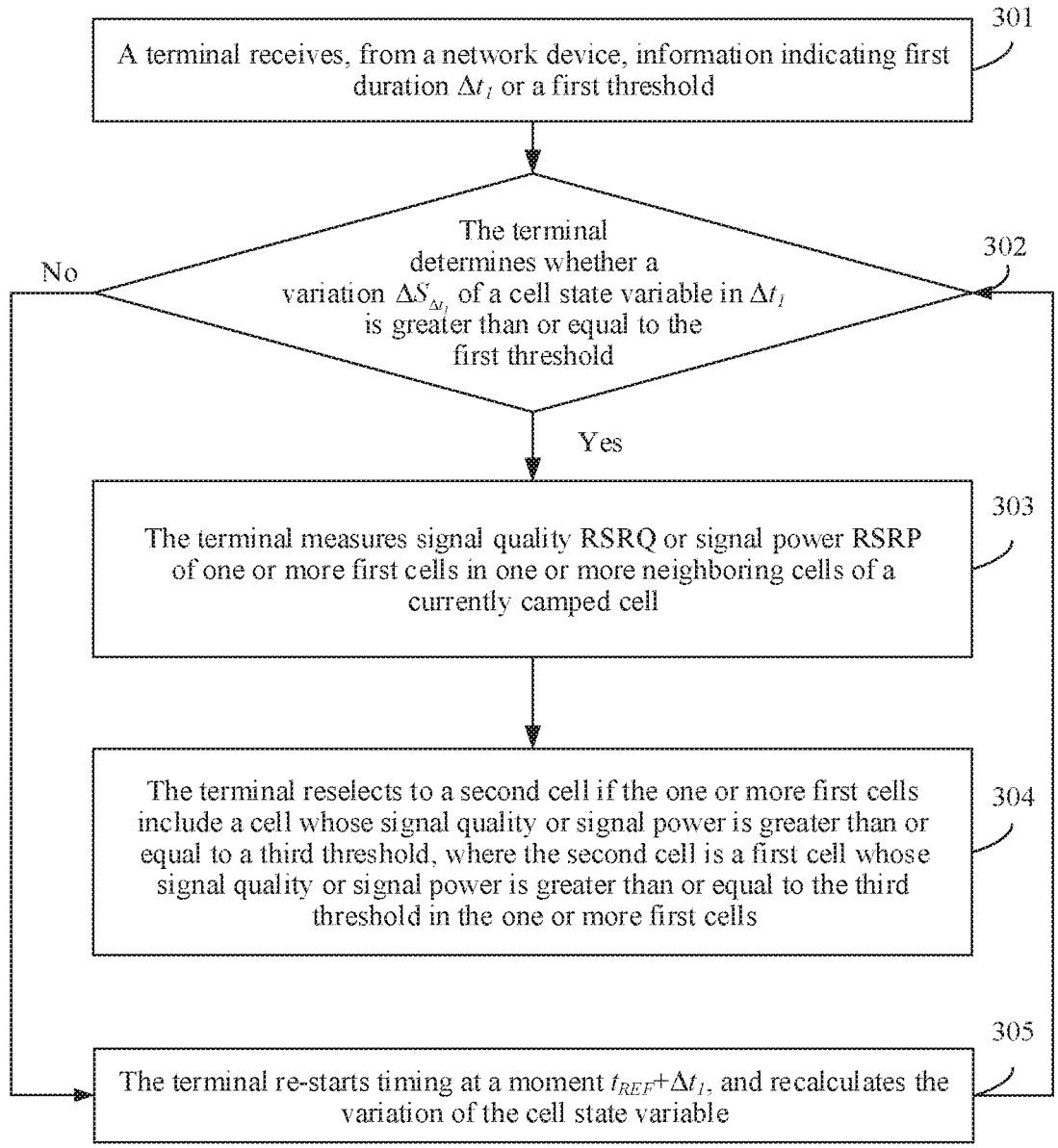
FIG. 3 is a flowchart of a measurement method according to an embodiment of this application.
Figure 4:
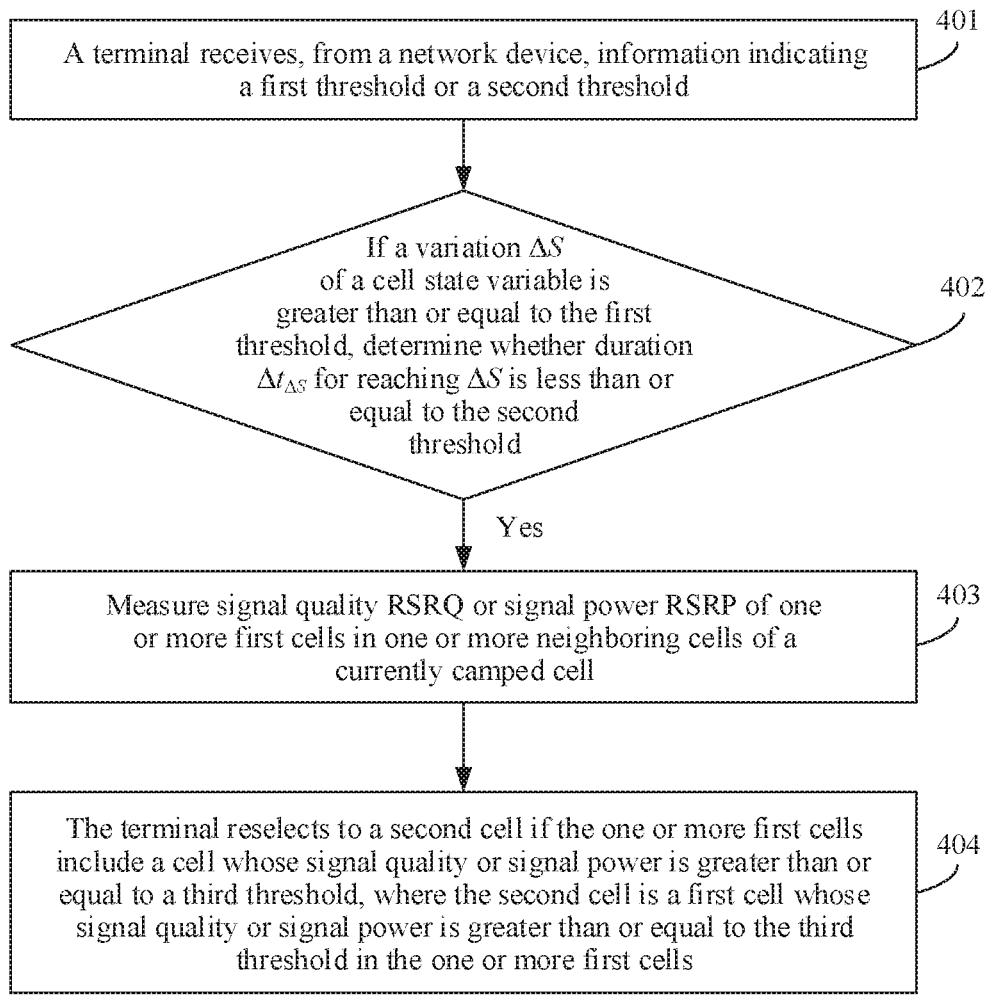
FIG. 4 is a flowchart of a measurement method according to an embodiment of this application.

A terminal in idle mode may measure, in a currently camped cell, a neighboring cell by using a measurement method shown in FIG. 3 or FIG. 4, and further reselect, based on a measurement result, a cell to camp on. The following first describes a first measurement method used for the terminal in idle mode. As shown in FIG. 3. The method may include the following steps.

Step 301: The terminal receives, from a network device, information indicating first duration or a first threshold.

In this embodiment of this application, the network device may be a base station serving a cell on which the terminal currently camps, and the terminal is in idle mode and has not established a connection to the base station. In this case, the base station may broadcast the information indicating the first duration $\Delta t_1$ or the first threshold. The information may be information indicating only $\Delta t_1$, may be information indicating only the first threshold, or may be information indicating $\Delta t_1$ and the first threshold. The terminal may receive the information broadcast by the base station. It should be noted that, for ease of subsequent description, the first duration is marked as $\Delta t_1$ herein.

In addition, this step is an optional step, and the first duration $\Delta t_1$ and/or the first threshold may be preconfigured in the terminal.

Step 302: The terminal determines whether a variation $\Delta S_{\Delta t_1}$ of a cell state variable in $\Delta t_1$ is greater than or equal to the first threshold.

$\Delta S_{\Delta t_1} = |S_{t_{REF}} - S_{t_{REF}+\Delta t_1}|$, where $S_{t_{REF}}$ is a cell state variable of the currently camped cell at a reference time point $t_{REF}$, and $S_{t_{REF}+\Delta t_1}$ is a cell state variable of the currently camped cell at $t_{REF}+\Delta t_1$. The cell state variable includes signal power RSRP or signal quality RSRQ. In other words, $S_{t_{REF}}$ is signal quality or signal power of the currently camped cell that is measured by the terminal at the moment $t_{REF}$, $S_{t_{REF}+\Delta t_1}$ is signal quality or signal power of the currently camped cell that is measured by the terminal at $t_{REF}+\Delta t_1$, and $\Delta S_{\Delta t_1}$ is a variation of the signal quality or the signal power of the currently camped cell that is measured by the terminal in $\Delta t_1$. $S_{t_{REF}}$ may be greater than or less than $S_{t_{REF}+\Delta t_1}$. A magnitude of the variation of the cell state variable in $\Delta t_1$ may represent a degree of a cell state change.

Further, in this embodiment of this application, the reference time point $t_{REF}$ may be a moment at which the terminal camps on the currently camped cell, or may be a moment at which the terminal updates $S_{t_{REF}}$.

Based on this, in a possible implementation, the terminal measures and records signal quality or signal power of the currently camped cell at the moment at which the terminal camps on the currently camped cell, to obtain $S_{t_{REF}}$, and performs timing from the moment. After $\Delta t_1$, the terminal measures the signal quality or the signal power of the currently camped cell again to obtain $S_{t_{REF}+\Delta t_1}$, and calculates an absolute value $\Delta S_{\Delta t_1}$ of a difference between $S_{t_{REF}}$ and $S_{t_{REF}+\Delta t_1}$. The terminal may perform timing by using a timer. Specifically, the terminal may start the timer at the moment at which the terminal camps on the currently camped cell, where running duration of the timer is $\Delta t_1$. When the timer expires, the terminal is triggered to measure the signal quality or the signal power of the currently camped cell again.

In another possible implementation, the terminal may start timing from the moment of updating $S_{t_{REF}}$. After $\Delta t_1$, the terminal measures the signal quality or the signal power of the currently camped cell again, to obtain $S_{t_{REF}+\Delta t_1}$, and calculates an absolute value $\Delta S_{\Delta t_1}$ of a difference between $S_{t_{REF}}$ and $S_{t_{REF}+\Delta t_1}$.

Optionally, $t_{REF}+\Delta t_1$ may be a moment at which the terminal performs the last measurement or a moment at which the terminal performs a latest measurement, for example, may be defined as a current moment (Current). $S_{t_{REF}+\Delta t_1}$ is a result of the latest measurement or a result of measurement at the current moment.

Optionally, $\Delta S_{\Delta t_1}$ may also be a quantity of changed cells on which the terminal camps in $\Delta t_1$. A specific manner of counting the quantity of changed cells on which the terminal camps is described by using an example as follows: For example, if the terminal reselects from a cell A to a cell B the quantity of changed cells on which the terminal camps is 1; if the terminal reselects from a cell A to a cell B and then reselects from the cell B to a cell C, or the terminal reselects from a cell A to a cell B and then reselects from the cell B to the cell A the quantity of changed cells on which the terminal camps is 2. Based on this, it is assumed that a cell on which the terminal camps at $t_{REF}$ is a cell A, and a cell on which the terminal camps at $t_{REF}+\Delta t_1$ is a cell C. In this case, $\Delta S_{\Delta t_1}$ is a quantity of all cells in a process in which the terminal reselects from the cell A to the cell C in $\Delta t_1$.

It can be learned from the foregoing description that, $\Delta S_{\Delta t_1}$ may be the variation of the signal quality or the signal power of the currently camped cell in $\Delta t_1$, or may be the quantity of changed cells on which the terminal camps in $\Delta t_1$. Correspondingly, the first threshold may be a signal quality variation threshold or a signal power variation threshold, or may be a cell change quantity threshold.

When the variation of the cell state variable is the variation of the signal quality or the signal power of the currently camped cell in $\Delta t_1$, the terminal may determine, by determining whether the variation of the signal quality or the signal power of the currently camped cell in $\Delta t_1$ is greater than or equal to the first threshold, whether the signal quality or the signal power of the currently camped cell changes drastically. When the variation of the signal quality or the signal power of the currently camped cell in $\Delta t_1$ is greater than or equal to the first threshold, it indicates that a cell signal changes relatively drastically. In this case, the terminal may perform step 303. Otherwise, the terminal may perform step 305.

Optionally, when the variation of the cell state variable refers to the quantity of changed cells on which the terminal camps in $\Delta t_1$, the terminal may determine, by determining whether the quantity of changed cells in $\Delta t_1$ is greater than or equal to the first threshold, whether the terminal reselects a cell frequently. When the quantity of changed cells on which the terminal camps in $\Delta t_1$ is greater than or equal to the first threshold, it indicates that the terminal reselects a cell relatively frequently. In this case, the terminal may perform step 303. Otherwise, the terminal may perform step 305.

Optionally, in this step, to determine a cell signal change degree or a cell reselection frequency, the terminal determines whether $\Delta S_{\Delta t_1}$ is greater than or equal to the first threshold. Therefore, in a possible implementation of this embodiment of this application, in this step, the determining, by the terminal, whether $\Delta S_{\Delta t_1}$ is greater than or equal to the first threshold may alternatively be replaced with another implementation. Specifically, in this embodiment of this application, the first threshold received by the terminal from the network device may be an initial threshold configured by the network device for the terminal. After receiving the first threshold, the terminal may perform corresponding processing on the first threshold, to obtain a processed threshold. The terminal may compare $\Delta S_{\Delta t_1}$ with the processed threshold, to determine the cell signal change degree or the cell reselection frequency.

Step 303: The terminal measures signal quality RSRQ or signal power RSRP of one or more first cells in one or more neighboring cells of the currently camped cell if $\Delta S_{\Delta t_1}$ is greater than or equal to the first threshold.

The signal quality RSRQ is reference signal received quality (Reference Signal Received Quality), and the signal power RSRP is reference signal received power (Reference Signal Received Power).

If it is determined in step 302 that $\Delta S_{\Delta t_1}$ is greater than or equal to the first threshold in $\Delta t_1$, it indicates that a signal of the cell on which the terminal currently camps changes relatively drastically or the terminal reselects a cell relatively frequently. If the signal of the cell on which the terminal currently camps changes relatively drastically, it is very likely that the terminal may work abnormally soon in the currently camped cell. In this case, the terminal may start measurement on the neighboring cells. If the terminal reselects a cell relatively frequently, it indicates that the terminal changes a cell excessively frequently. In this case, the terminal may start measurement on the neighboring cells, to reselect and camp on a more appropriate cell (for example, camp on a cell with a larger coverage area) based on a measurement result. This reduces a quantity of times that the terminal measures and reselects a cell. The terminal may measure the signal quality of the one or more first cells in the neighboring cells, where a frequency of the first cell may be the same as or different from a frequency of the currently camped cell. In other words, the neighboring cells include an intra-frequency neighboring cell and/or an inter-frequency neighboring cell.

Further, when the signal of the currently camped cell changes drastically or the terminal reselects a cell relatively frequently, if the terminal reselects, based on a measurement result for the neighboring cells, to a cell that has a same coverage area as or a smaller coverage area than the currently camped cell, movement with even a relatively small distance in a movement process of the terminal causes a relatively large signal quality change. In this case, the terminal frequently performs cell measurement and reselection, increasing power consumption of the terminal. Based on this, in this embodiment of this application, if the signal of the currently camped cell changes drastically or the terminal reselects a cell relatively frequently, to avoid subsequent frequent measurement and reselection performed by the terminal, the first cell that can be measured by the terminal may be a cell whose coverage area is larger than that of the currently camped cell. Because the coverage area of the first cell is greater than the coverage area of the cell on which the terminal currently camps, the terminal may reselect, by measuring the signal quality or the signal power of the first cell, to the cell whose coverage area is larger than the coverage area of the currently camped cell. In this way, even if the terminal is in a moving state, when the terminal moves a same distance, a signal of the first cell changes more slowly compared with a case in which the terminal camps on a cell with a smaller coverage area. In this way, a quantity of times that the terminal performs cell measurement and a quantity of times of performing cell reselection based on a measurement result can be relatively reduced, reducing power consumption of the terminal.

It should be noted that the neighboring cells of the cell on which the terminal currently camps may include both the first cell whose coverage area is larger than that of the currently camped cell and a cell whose coverage area is the same as or smaller than that of the currently camped cell. In this embodiment of this application, during cell deployment, a coverage area of each cell may be represented by using a priority of a frequency of each cell, a priority of each cell, a frequency of each cell, or a cell type of each cell.

Specifically, when a coverage area of a cell is represented by using a priority of a frequency of the cell, a priority of a frequency of a cell with a larger coverage area may be set to a smaller value, and a priority of a frequency of a cell with a smaller coverage area may be set to a larger value. In this case, the terminal may receive, from the network device, information indicating a frequency and a priority of the frequency. In this way, when determining that $\Delta S_{\Delta t_1}$ is greater than or equal to the first threshold, the terminal may select, based on priorities of frequencies of cells, a first cell with a larger coverage area from the neighboring cells of the currently camped cell, to perform measurement.

The terminal may receive, from the network device, configuration information that includes at least two frequencies (that is, two or more frequencies) and a priority corresponding to each of the at least two frequencies, where the at least two frequencies include the frequency of the currently camped cell. The terminal may select, from the at least two frequencies, a frequency whose priority is lower than a priority of the frequency of the currently camped cell, and measure signal quality of one or more first cells that are in the neighboring cells and that are deployed on the selected frequency. A lower priority of a frequency indicates a larger coverage area of a cell deployed on the corresponding frequency. Therefore, the priority of the frequency selected by the terminal from the at least two frequencies is lower than the priority of the frequency of the currently camped cell, that is, a coverage area of a cell deployed on the selected frequency is larger than the coverage area of the currently camped cell. In this way, when the terminal measures the cell deployed on the selected frequency in the neighboring cells, the terminal actually measures a first cell that is in the neighboring cells and whose coverage area is larger than the coverage area of the currently camped cell.

When a coverage area of a cell is represented by using a priority of the cell, a priority of a cell with a larger coverage area may be set to a smaller value, and a priority of a cell with a smaller coverage area may be set to a larger value. In this case, the terminal may receive information indicating a priority of a cell from the network device. In this way, when determining that $\Delta S_{\Delta t_1}$ is greater than or equal to the first threshold, the terminal may select, from the neighboring cells, a cell with a priority lower than that of the currently camped cell as the first cell. A lower priority indicates a larger coverage area. Because the priority of the first cell is lower than that of the currently camped cell, the coverage area of the first cell is larger than that of the currently camped cell.

When a coverage area of a cell is represented by using a frequency of the cell, generally, a cell with a lower frequency has a larger coverage area, and a cell with a higher frequency has a smaller coverage area. In this case, the terminal may receive information indicating a frequency of a cell from the network device. In this way, when determining that $\Delta S_{\Delta t_1}$ is greater than or equal to the first threshold, the terminal may select, from the neighboring cells, a cell with a frequency lower than that of the currently camped cell as the first cell. A lower frequency indicates a larger coverage area. Because the frequency of the first cell is lower than that of the currently camped cell, the coverage area of the first cell is larger than that of the currently camped cell.

When a coverage area of a cell is represented by using a cell type, a cell type of a cell with a larger coverage area may be set as a macro cell, and a cell type of a cell with a smaller coverage area may be set as a micro cell. In this case, the terminal may receive information indicating a cell type of a cell from the network device. In this way, when determining that $\Delta S_{\Delta t_1}$ is greater than or equal to the first threshold, the terminal may select, from the neighboring cells, a cell whose cell type is a macro cell as the first cell.

Optionally, in a possible implementation, when a coverage area of a cell is represented by using a cell type, a cell with a relatively large coverage area may be deployed on one or more first frequencies, and a cell type corresponding to the first frequency is set to a macro cell; a cell with a relatively small coverage area is deployed on one or more second frequencies, and a cell type corresponding to the second frequency is set to a micro cell. In this case, the terminal may receive, from the network device, information that includes at least two frequencies and a cell type corresponding to each of the at least two frequencies, where the at least two frequencies include the frequency of the currently camped cell. The terminal may select, from the at least two frequencies, a frequency corresponding to which a cell type is a macro cell, and use one or more cells that are in the neighboring cells and that are deployed on the selected frequency as the first cell or the first cells.

Optionally, the terminal may further start a first timer when determining that $\Delta S_{\Delta t_1}$ is greater than or equal to the first threshold, where running duration of the first timer is second duration $\Delta t_2$. In $\Delta t_2$, the terminal may continuously measure the currently camped cell and the neighboring cells. If the terminal does not reselect to another cell by measuring signals of the neighboring cells, the terminal may obtain a plurality of cell state variables $\{S_i | i$ is a positive integer, $i \leq N\}$ by measuring the currently camped cell in $\Delta t_2$, where N is a total quantity of times of measuring the currently camped cell in $\Delta t_2$, and $S_i$ is a cell state variable obtained through the $i^{th}$ measurement. If any $S_i$ in $\{S_i | i$ is a positive integer, $i \leq N\}$ satisfies that $|S_{t_{REF}} - S_i|$ is greater than or equal to the first threshold, $S_{t_{REF}}$ is updated so that $S_{t_{REF}}$ is equal to $S_N$. That is, in this embodiment of this application, the terminal may compare $S_{t_{REF}}$ with all cell state variables measured in $\Delta t_2$. If an absolute value of a difference between $S_{t_{REF}}$ and each of all the measured cell state variables is greater than or equal to the first threshold, the terminal may update $S_{t_{REF}}$, so that the updated $S_{t_{REF}}$ is equal to $S_N$, where $S_N$ is a cell state variable obtained through the last measurement in $\Delta t_2$ in which the first timer runs. Optionally, an end moment of $\Delta t_2$ may be referred to as the current moment (Current), and $S_N$ is a cell state variable obtained through the latest measurement.

It can be learned from the foregoing description that, when determining that $\Delta S_{\Delta t_1}$ is greater than or equal to the first threshold, the terminal may start measurement on the neighboring cells. In addition, the terminal continuously measures a cell state variable of the currently camped cell in $\Delta t_2$, and calculates a difference between the measured cell state variable and $S_{t_{REF}}$. In this way, if the terminal fails to reselect to another cell within $\Delta t_2$, the terminal may update $S_{t_{REF}}$ by using the foregoing method. Then, the terminal may determine, by using the updated $S_{t_{REF}}$, whether $\Delta S_{\Delta t_1}$ is greater than or equal to the first threshold, to determine whether to start measurement again. Compared with a case in which the terminal continuously measures a neighboring cell, a quantity of measurements is reduced, and power consumption of the terminal is reduced.

The terminal may start measurement on the neighboring cells only when determining, by using the measurement method described in steps 301 to 303, that the cell state changes relatively drastically. Compared with a prior-art method in which measurement is performed immediately after a variation of signal quality of a currently camped cell reaches a specific threshold, in this application, a quantity of measurements is reduced. Further, when the cell state changes relatively drastically, the terminal may further perform step 304, that is, perform cell reselection based on the measurement result, so that the terminal can reselect to a cell with a larger coverage area as much as possible in some scenarios, to reduce a quantity of cell reselections and reduce power consumption of the terminal.

Step 304: The terminal reselects to a second cell if the one or more first cells include a cell whose signal quality or signal power is greater than or equal to a third threshold, where the second cell is a first cell whose signal quality or signal power is greater than or equal to the third threshold in the one or more first cells.

After the terminal learns, through measurement in step 303, that the signal quality or the signal power of the one or more first cells in the neighboring cells of the currently camped cell, the terminal may perform cell reselection based on the signal quality or the signal power of the one or more first cells. The terminal may reselect to a cell with a best signal in the one or more first cells. Specifically, the terminal may use, as the second cell, a first cell whose signal quality or signal power is greater than or equal to the third threshold in the one or more first cells, and reselect to the second cell. Certainly, if there are a plurality of first cells whose signal quality or signal power is greater than or equal to the third threshold, the terminal may use a first cell with highest signal quality or signal power as the second cell, and reselect to the second cell.

Step 305: If $\Delta S_{\Delta t_1}$ is less than the first threshold, the terminal re-start timing at the moment $t_{REF}+\Delta t_1$, recalculates the variation of the cell state variable, and performs step 302 again.

If $\Delta S_{\Delta t_1}$ is less than the first threshold, it indicates that the variation of the cell state variable does not meet the condition for starting measurement by the terminal. In this case, the terminal may re-start timing from the current moment, that is, the moment $t_{REF}+\Delta t_1$, and update the moment from $t_{REF}$ to $t_{REF}+\Delta t_1$. After $\Delta t_1$, that is, at the moment $t_{REF}+\Delta t_1$, the terminal may measure the cell state variable again, calculate the absolute value of the difference between the measured cell state variable and the cell state variable $S_{t_{REF}}$ that exists at the moment $t_{REF}$, to obtain $\Delta S_{\Delta t_1}$. Then, the terminal may perform step 302 again, to compare $\Delta S_{\Delta t_1}$ with the first threshold. If $\Delta S_{\Delta t_1}$ is greater than or equal to the first threshold, steps 303 and 304 may be performed. If $\Delta S_{\Delta t_1}$ is less than the first threshold, the foregoing process may be repeated.

Optionally, in a possible implementation, when determining that $\Delta S_{\Delta t_1}$ is less than the first threshold, the terminal may further update the cell state variable from $S_{t_{REF}}$ to $S_{t_{REF}+\Delta t_1}$, and re-start timing from the moment $t_{REF}+\Delta t_1$. In this case, the moment is updated from $t_{REF}$ to $t_{REF}+\Delta t_1$. After $\Delta t_1$, that is, at the moment $t_{REF}+\Delta t_1$, the terminal may measure the cell state variable again calculate the absolute value of the difference between the measured cell state variable $S_{t_{REF}+\Delta t_1}$ and the cell state variable $S_{t_{REF}}$ that exists at the moment $t_{REF}$, to obtain $\Delta S_{\Delta t_1}$. Then, the terminal may perform step 302 again, to compare $\Delta S_{\Delta t_1}$ with the first threshold. If $\Delta S_{\Delta t_1}$ is greater than or equal to the first threshold, steps 303 and 304 are performed. If $\Delta S_{\Delta t_1}$ is less than the first threshold, the foregoing process may continue to be repeated.

It should be noted that in this embodiment of this application, the terminal may perform timing by setting a timer.

Optionally, when step 302 is returned to in the foregoing two manners, the terminal may further update the first threshold. For example, the terminal may subtract a specified value from the first threshold and use a result as a new first threshold, and then compare the variation of the cell state variable with the updated first threshold.

In this embodiment of this application, the terminal may determine whether the variation of the cell state variable in the first duration is greater than or equal to the first threshold. If the first duration is greater than or equal to the first threshold, the terminal may measure the signal quality or the signal power of the one or more first cells in the neighboring cells of the currently camped cell. That is, in this embodiment of this application, the terminal may determine, based on the variation of the cell state variable in the first duration, whether to start measurement on the neighboring cells of the currently camped cell, where the variation of the cell state variable in the first duration actually reflects whether the cell state changes drastically. It can be learned that, in this embodiment of this application, the terminal may start measurement on the neighboring cells only when determining that the cell state changes relatively drastically. Compared with a prior-art method in which measurement is performed immediately after a variation of signal quality of a currently camped cell reaches a specific threshold, in this application, a quantity of measurements is reduced and power consumption of the terminal is reduced.

In addition, in this application, the one or more first cells measured by the terminal may be cells whose coverage areas are greater than the coverage area of the currently camped cell. Then, if the measured signal quality or signal power of the one or more first cells includes a cell whose signal quality or signal power is greater than or equal to the third threshold, the terminal may reselect to the second cell, where the second cell is a first cell whose signal quality or signal power is greater than or equal to the third threshold in the one or more first cells. In this way, when a signal of a cell on which the terminal in idle mode and in the moving state currently camps changes relatively drastically, or when the terminal relatively frequently reselects a cell, the terminal may directly reselect to a cell with a larger coverage area. In this way, because the coverage area of the reselected cell is larger than that of the previous cell, when the terminal moves, signal quality does not change drastically due to a relatively small moving distance. Further, cell measurement or reselection is not performed frequently. In this way, quantities of times of cell measurement and reselection performed by the terminal are reduced, and power consumption of the terminal is reduced.

The following describes a second measurement method used for the terminal in idle mode. As shown in FIG. 4, the method includes the following steps.

Step 401: The terminal receives, from a network device, information indicating a first threshold or a second threshold.

In this embodiment of this application, the network device may be a base station serving a cell on which the terminal currently camps, and the terminal is in idle mode and has not established a connection to the base station. In this case, the base station may broadcast the information indicating the first threshold or the second threshold. The information may be information indicating only the first threshold, may be information indicating only the second threshold, or may be information indicating the first threshold and the second threshold. The terminal may receive the information broadcast by the base station.

It should be noted that the first threshold may be a signal quality variation threshold, a signal power variation threshold, or a cell change quantity threshold. The second threshold is a time threshold.

In addition, this step is an optional step, and the first threshold and/or the second threshold may be preconfigured in the terminal.

Step 402: If a variation $\Delta S$ of a cell state variable is greater than or equal to the first threshold, determine whether duration $\Delta t_{\Delta S}$ for reaching $\Delta S$ is less than or equal to the second threshold.

$\Delta S = |S_{t_{REF}} - S_{t_{REF}+\Delta t_{\Delta S}}|$, where $S_{t_{REF}}$ is a cell state variable of the currently camped cell at a reference time point $t_{REF}$, and $S_{t_{REF}+\Delta t_{\Delta S}}$ is a cell state variable of the currently camped cell at $t_{REF}+\Delta t_{\Delta S}$. The cell state variable includes signal power RSRP or signal quality RSRQ. The signal quality RSRQ is reference signal received quality (Reference Signal Received Quality), and the signal power RSRP is reference signal received power (Reference Signal Received Power). That is, in this embodiment of this application, the terminal may measure a cell state variable $S_{REF}$ of the currently camped cell at a reference time point $t_{REF}$. At the same time, the terminal may start a timer. Then, the terminal may continuously measure the cell state variable of the currently camped cell, and calculate, after each time of measurement, an absolute value $\Delta S$ of a difference between the currently measured cell state variable and the cell state variable measured at the reference time point $t_{REF}$. The terminal determines whether $\Delta S$ is greater than or equal to the first threshold. If $\Delta S$ is greater than or equal to the first threshold, the terminal may obtain, by using a timer, duration $\Delta t_{\Delta S}$ from the reference time point $t_{REF}$ to a current moment (that is, a moment at which the variation of the cell state variable reaches $\Delta S$), and determine whether $\Delta t_{\Delta S}$ is less than or equal to the second threshold. According to the foregoing method, the terminal may measure, in real time, the cell state variable that exists after the reference time point $t_{REF}$, to obtain the variation of the cell state variable in real time. When the variation of the cell state variable reaches the first threshold, the terminal determines a degree of a cell state change based on the duration that has elapsed. Compared with directly measuring the cell state variable at an end moment of specific duration and calculating a variation of the cell state variable based on a measurement result, determining the degree of the cell state change based on the variation of the cell state variable is more accurate.

It should be noted that the reference time point $t_{REF}$ may be a moment at which the terminal camps on the currently camped cell, or may be a moment at which the terminal updates $S_{t_{REF}}$.

Optionally, $t_{REF}+\Delta t_{\Delta S}$ may be a moment at which the terminal performs the last measurement or a moment at which the terminal performs a latest measurement, for example, may be defined as a current moment (Current). $S_{t_{REF}+\Delta t_{\Delta S}}$ is a result of the latest measurement or a result of measurement at the current moment.

Based on this, in a possible implementation, the terminal measures and records signal quality or signal power of the currently camped cell at the moment at which the terminal camps on the currently camped cell, to obtain $S_{t_{REF}}$. In addition, the terminal continuously measures the signal quality or the signal power of the currently camped cell from the moment, and calculates an absolute value ΔS of a difference between $S_{t_{REF}}$ and $S_{t_{REF}+\Delta t_{\Delta S}}$ each time $S_{t_{REF}+\Delta t_{\Delta S}}$ is obtained through measurement.

In another possible implementation, the terminal may use the moment of updating $S_{t_{REF}}$ as the reference time point, and use a cell state variable measured at this moment as the updated $S_{t_{REF}}$. Then, the terminal continuously measures the signal quality or the signal power of the currently camped cell again, and calculates an absolute value ΔS of a difference between $S_{t_{REF}}$ and $S_{t_{REF}+\Delta t_{\Delta S}}$ each time $S_{t_{REF}+\Delta t_{\Delta S}}$ is obtained through measurement.

When it is determined that ΔS is greater than or equal to the first threshold, it indicates that the cell state has changed greatly. In this case, the terminal may further determine a time period $\Delta t_{\Delta S}$ used for such a major change. If $\Delta t_{\Delta S}$ is less than or equal to the second threshold, it indicates that the cell state has changed greatly in a relatively short time period, that is, the cell state changes relatively drastically. In this case, the terminal may perform step 403. Otherwise, the terminal may perform step 405.

Optionally, in this step, the first threshold and the second threshold are mainly used to determine whether the cell state changes drastically. Based on this, in this embodiment of this application, this step may be alternatively replaced with another implementation. Specifically, in this embodiment of this application, the first threshold or the second threshold received by the terminal from the network device may be an initial threshold configured by the network device for the terminal. After receiving the first threshold or the second threshold, the terminal may perform corresponding processing on the first threshold or the second threshold, to obtain a processed threshold. The terminal may compare ΔS with the processed first threshold, or compare $\Delta t_{\Delta S}$ with the processed threshold, to determine whether the cell state changes drastically.

Step 403: Measure signal quality RSRQ or signal power RSRP of one or more first cells in one or more neighboring cells of the currently camped cell if $\Delta t_{\Delta S}$ is less than or equal to the second threshold.

If it is determined, through step 402, that $\Delta t_{\Delta S}$ is less than or equal to the second threshold, it indicates that a signal of the cell on which the terminal currently camps changes relatively drastically, it is very likely that the terminal may work abnormally soon in the currently camped cell. In this case, the terminal may start measurement on the neighboring cells, to reselect to and camp on a more appropriate cell based on a measurement result.

The terminal may measure the signal quality or the signal power of the one or more first cells in the neighboring cells of the currently camped cell, where the first cell may be a cell that is in the neighboring cells and whose frequency is the same as or different from a frequency of the currently camped cell. Optionally, the first cell may alternatively be a cell whose coverage area is larger than the coverage area of the cell on which the terminal currently camps.

Specifically, when the first cell is a cell whose coverage area is larger than the coverage area of the cell on which the terminal currently camps, for a specific implementation in which the terminal measures the one or more first cells in the neighboring cells, refer to the related implementation in step 303 in the foregoing embodiment. Details are not described in this embodiment of this application again.

Optionally, the terminal may further start a first timer when determining that $\Delta t_{\Delta S}$ is less than or equal to the second threshold, where running duration of the first timer is second duration $\Delta t_2$. In $\Delta t_2$, the terminal may measure the currently camped cell. If the terminal does not reselect to another cell by measuring signals of the neighboring cells, the terminal may obtain a plurality of cell state variables $\{S_i | i$ is a positive integer, $i \le N\}$ that are in $\Delta t_2$, where N is a total quantity of times of measuring the currently camped cell in $\Delta t_2$, and $S_i$ is a cell state variable obtained through the $i^{th}$ measurement. If any $S_i$ in $\{S_i | i$ is a positive integer, $i \le N\}$ is greater than or equal to the first threshold, $S_{t_{REF}}$ is updated so that $S_{t_{REF}}$ is equal to $S_N$. That is, in this embodiment of this application, the terminal may compare $S_{t_{REF}}$ with all cell state variables measured in $\Delta t_2$. If an absolute value of a difference between $S_{t_{REF}}$ and each of all the measured cell state variables is greater than or equal to the first threshold, the terminal may update $S_{t_{REF}}$, so that the updated $S_{t_{REF}}$ is equal to $S_N$, where $S_N$ is a variation of the cell state variable obtained through the last measurement in $\Delta t_2$ in which the first timer runs. Optionally, an end moment of $\Delta t_2$ may be referred to as the current moment (Current), and $S_N$ is a cell state variable obtained through the latest measurement.

The terminal may start measurement on the neighboring cells only when determining, by using the measurement method described in steps 401 to 403, that the cell state changes relatively drastically. Compared with a prior-art method in which measurement is performed immediately after a variation of signal quality of a currently camped cell reaches a specific threshold, in this application, a quantity of measurements is reduced. Further, when the cell state variable of the currently camped cell changes drastically, the terminal may further perform step 404, that is, perform cell reselection based on the measurement result. In this way, the terminal may reselect to a cell with a relatively large coverage area as much as possible, to reduce a quantity of cell reselections and reduce power consumption of the terminal.

Step 404: The terminal reselects to a second cell if the one or more first cells include a cell whose signal quality or signal power is greater than or equal to a third threshold, where the second cell is a first cell whose signal quality or signal power is greater than or equal to the third threshold in the one or more first cells.

For a specific implementation of this step, refer to the specific implementation in step 304 in the foregoing embodiment. Details are not described herein again in this embodiment of this application.

In this embodiment of this application, the terminal may receive, from the network device, the information indicating the first threshold and the second threshold. Then, the terminal may determine whether the variation ΔS of the cell state variable is greater than or equal to the first threshold. If ΔS is greater than or equal to the first threshold, the terminal may further determine whether the duration for reaching ΔS is less than or equal to the second threshold. If the duration is less than or equal to the second threshold, it indicates that the cell state changes greatly in a relatively short time. In this case, the terminal may start measurement on the neighboring cells, so that the terminal can reselect to and camp on a more appropriate cell based on the measurement result. In this application, the terminal starts measurement on the neighboring cells only when the cell state changes relatively drastically. Therefore, compared with the prior art in which measurement is performed immediately after the cell state changes relatively greatly, in this application, a quantity of measurements is reduced, and correspondingly a quantity of cell reselections is reduced. Further, in this application, during cell reselection, the terminal may reselect, by measuring only a cell with a relatively large coverage area in the neighboring cells, to a cell whose coverage area is larger than that of the currently camped cell. Therefore, even if the terminal is in a moving state, because the coverage area of the reselected cell is larger, signal quality does not change drastically due to a relatively small moving distance. Further, cell measurement or reselection is not performed frequently. In this way, quantities of times of cell measurement and reselection performed by the terminal are reduced, and power consumption of the terminal is reduced.

Figure 5:
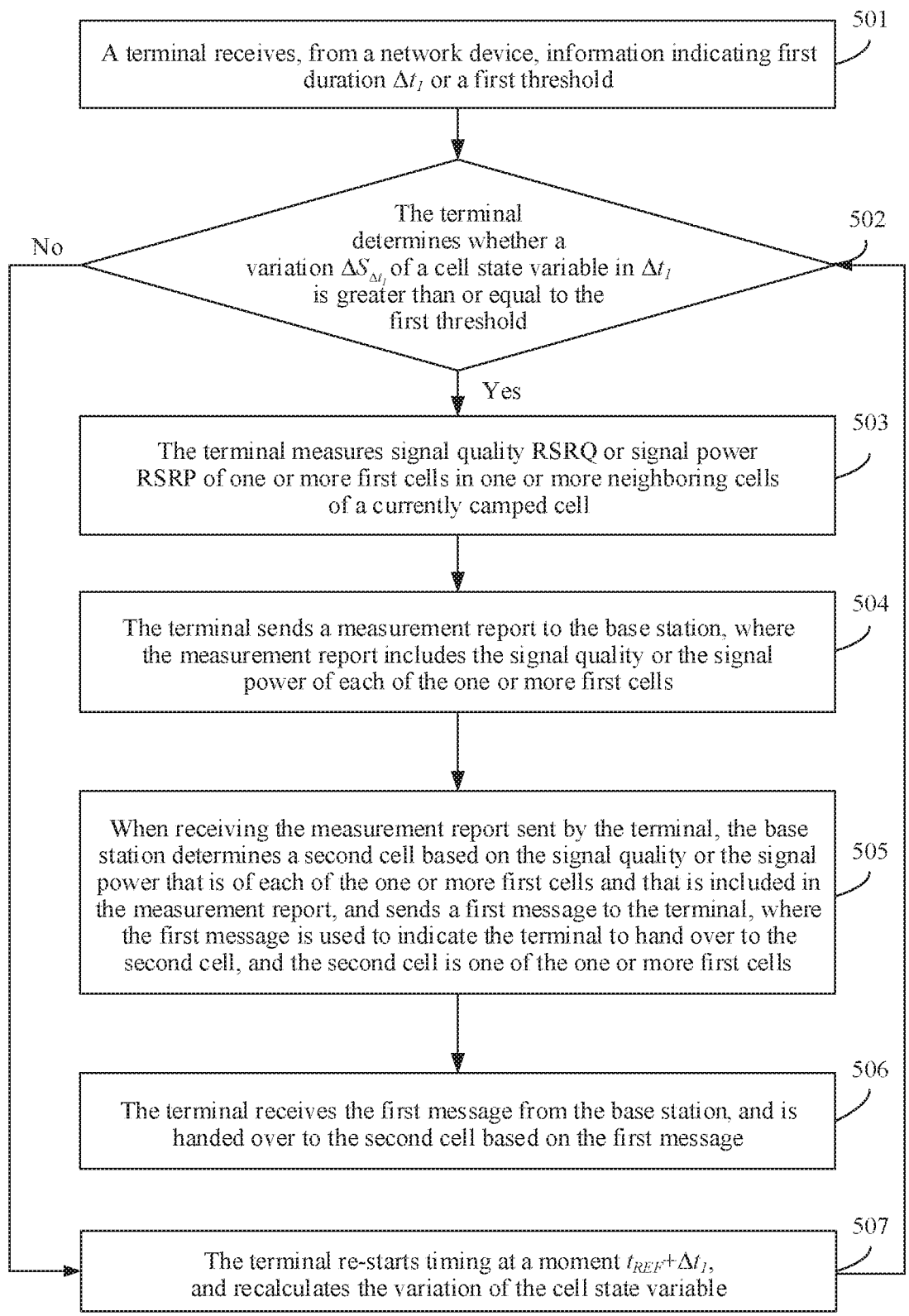
FIG. 5 is a flowchart of a measurement method according to an embodiment of this application.

In the foregoing embodiments, specific implementation processes in which the terminal in idle mode measures the neighboring cells in the currently camped cell, and then reselects, based on the measurement result, to another cell to camp on are mainly described. For a terminal in connected mode, because the terminal has established a communication connection to a base station serving a cell on which the terminal currently camps, the terminal may measure a neighboring cell by using two measurement methods shown in FIG. 5 and FIG. 6, and is handed over from the currently camped cell to another cell based on a reported a measurement result. The following first describes a first measurement method used for the terminal in connected mode. As shown in FIG. 5, the method includes the following steps.

Step 501: The terminal receives, from a network device, information indicating first duration $\Delta t_1$ or a first threshold.

In this embodiment of this application, the network device may be a base station serving a cell on which the terminal currently camps, and the terminal is in connected mode, that is, the terminal has established a communication connection to the base station serving the currently camped cell. In this case, the base station may send the information indicating the first duration or the first threshold. The terminal may receive the information that is sent by the base station and that indicates the first duration or the first threshold. In addition, this step is an optional step, and the first duration $\Delta t_1$ and/or the first threshold may be preconfigured in the terminal.

Step 502: The terminal determines whether a variation $\Delta S_{\Delta t_1}$ of a cell state variable in $\Delta t_1$ is greater than or equal to the first threshold.

For a specific implementation of this step, refer to step 302. Details are not described herein again in this embodiment of this application.

Step 503: The terminal measures signal quality RSRQ or signal power RSRP of one or more first cells in one or more neighboring cells of the currently camped cell if $\Delta S_{\Delta t_1}$ is greater than or equal to the first threshold.

It should be noted that the first cell may be a cell that is in the neighboring cells and that has a frequency the same as or different from that of the currently camped cell.

Optionally, when a cell state changes relatively drastically, to hand over the terminal to a cell with a relatively large coverage area as much as possible, the first cell may alternatively be a cell that is in the neighboring cells and whose coverage area is larger than a coverage area of the currently camped cell.

For a specific implementation of this step, refer to step 303. Details are not described herein in this embodiment of this application.

Step 504: The terminal sends a measurement report to the base station, where the measurement report includes signal quality or signal power of each of the one or more first cells.

After the terminal measures the signal quality or the signal power of the one or more first cells in step 503, the terminal may send the measurement report to the base station. The measurement report may include the signal quality or the signal power of each of the one or more first cells.

When the first cell is a cell that is in the neighboring cells and whose coverage area is larger than the coverage area of the currently camped cell, because the coverage area of the first cell is larger than the signal coverage area of the currently camped cell, the terminal directly reports the signal quality or the signal power of the first cell to the base station. In this way, the base station can directly hand over, based on the signal quality of the first cell, the terminal to the first cell whose coverage area is larger. This avoids frequent measurement, reporting, and handover caused because the terminal is always handed over to a cell with a relatively small coverage area in a moving process, reduces power consumption of the terminal, and reduces signaling overheads between the terminal and the base station.

Optionally, after the terminal measures the signal quality or the signal power of the one or more first cells, the terminal may not report the signal quality or the signal power of all of the first cells, but selectively reports the measured signal quality or signal power of some of the one or more first cells.

The terminal may select a first cell with relatively high signal quality or signal power in the one or more first cells, for reporting. Specifically, the terminal may select, from the signal quality or the signal power of the one or more first cells, signal quality or signal power greater than the third threshold, for reporting. In this way, if the coverage area of the first cell is larger than the coverage area of the currently camped cell, the base station can directly hand over the terminal to the first cell whose coverage area is larger and whose signal quality or signal power is higher.

Step 505: When receiving the measurement report sent by the terminal, the base station determines a second cell based on the signal quality or the signal power that is of each of the one or more first cells and that is included in the measurement report, and sends a first message to the terminal, where the first message is used to indicate the terminal to hand over to the second cell, and the second cell is one of the one or more first cells.

When receiving the measurement report sent by the terminal, the base station may determine the second cell based on the signal quality or the signal power that is of each of the one or more first cells and that is included in the measurement report. The base station may determine the second cell in different manners based on different measurement reports sent by the terminal.

Specifically, it can be learned from step 404 that, in a possible case, the measurement report reported by the terminal includes the signal quality or the signal power of each of the one or more first cells. In this case, the base station may select, from the one or more first cells, a first cell whose signal quality or signal power is greater than or equal to the third threshold as the second cell. If there are a plurality of first cells whose signal quality or signal power is greater than the third threshold, a cell with highest signal quality or signal power is selected as the second cell.

In a possible case, the measurement report reported by the terminal includes signal quality or signal power that is of some first cells and that is greater than or equal to the third threshold in the signal quality or the signal power of the one or more first cells. In this case, the base station may select, from the some first cells, a first cell with highest signal quality or signal power as the second cell.

After determining the second cell, the base station may send a first message to the terminal, where the first message is used to indicate the terminal to hand over from the currently camped cell to the second cell.

In addition, when performing cell handover, the base station may consider many factors. Sometimes, the base station may not perform cell handover merely by using the measurement report reported by the terminal. Therefore, this step is an optional step.

Step 506: The terminal receives the first message from the base station, and is handed over to the second cell based on the first message.

Step 507: If $\Delta S_{\Delta t_1}$ is less than the first threshold, the terminal re-starts timing at the moment $t_{REF}+\Delta t_1$, recalculates the variation of the cell state variable, and performs step 502 again.

For a specific implementation of this step, refer to the specific implementation in step 305. Details are not described herein again in this embodiment of this application.

In this embodiment of this application, the terminal may determine whether the variation $\Delta S_{\Delta t_1}$ of the cell state variable in $\Delta t_1$ is greater than or equal to the first threshold. If $\Delta S_{\Delta t_1}$ is greater than or equal to the first threshold, the terminal may directly measure the signal quality or the signal power of the one or more first cells in the neighboring cells of the currently camped cell. Then, the terminal may send the measurement report to the base station based on the signal quality or the signal power of the one or more first cells, so that the base station sends, based on the measurement report, the first message used to indicate the terminal to hand over to the second cell, where the second cell is one of the one or more first cells. That is, when a signal of the cell on which the terminal in connected mode currently camps changes relatively drastically, or when the terminal is handed over to a cell relatively frequently, the terminal measures the signal quality or the signal power of the neighboring cells and reports the signal quality or the signal power to the base station. Compared with the prior art in which the terminal measures signal quality or signal power of a neighboring cell and reports the signal quality or the signal power to the base station when a cell signal changes relatively greatly, in this application, a quantity of measurements and a quantity of times for which the terminal reports the signal quality or the signal power to the base station are reduced, and signaling overheads are reduced. Further, in this application, the terminal may directly measure signal quality of a first cell with a relatively large coverage area, and report the signal quality to the base station. In this way, the base station can directly hand over the terminal to the cell with the relatively large coverage area based on the reported signal quality or signal power. Therefore, when the terminal moves, signal quality does not change drastically due to a relatively small moving distance. Further, cell measurement or handover is not performed frequently. In this way, quantities of times of cell measurement and handover performed by the terminal are reduced, and power consumption of the terminal is reduced. In addition, a quantity of times of reporting the signal quality by the terminal is reduced, thereby reducing signaling overheads.

Figure 6:
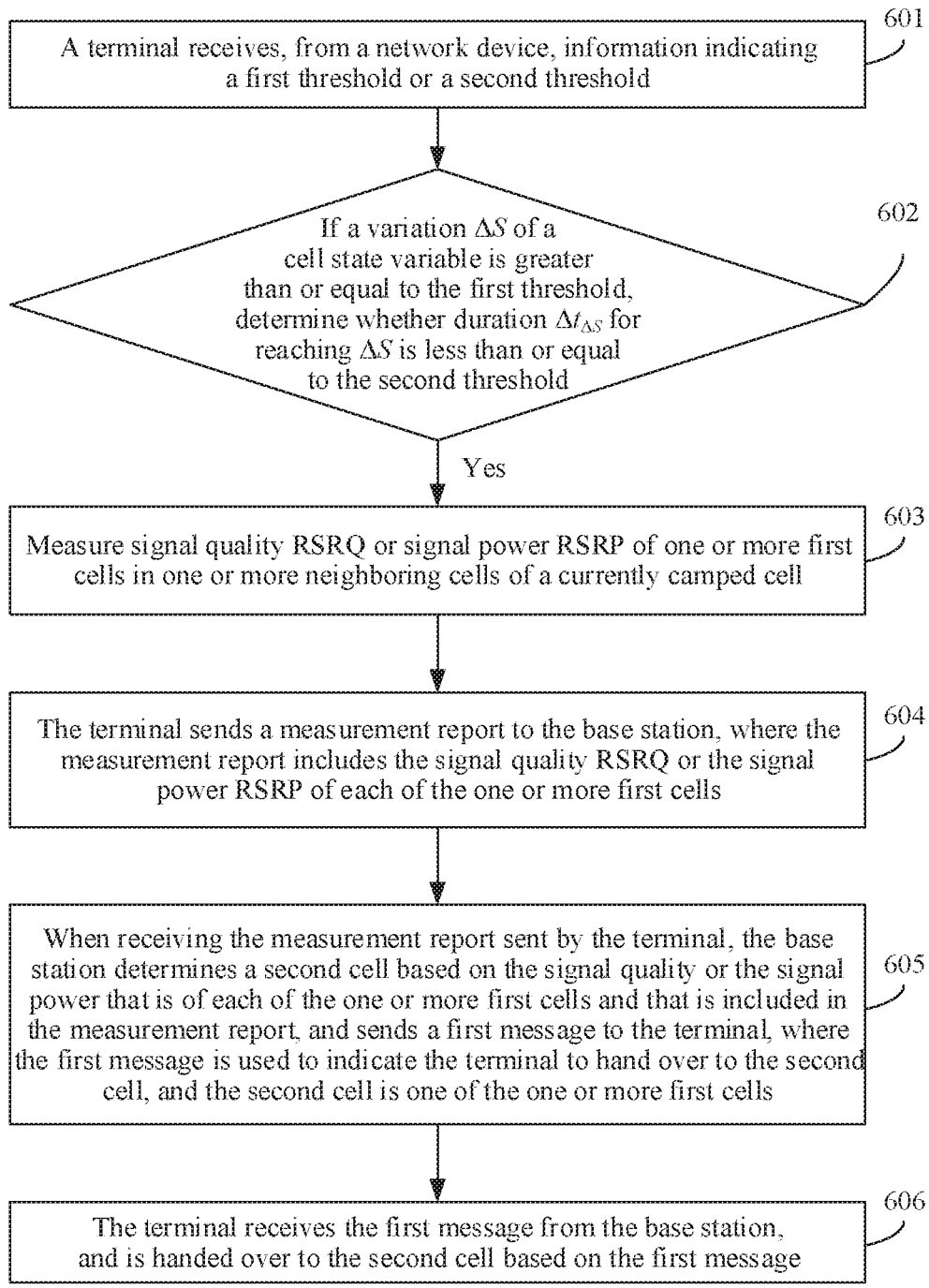
FIG. 6 is a flowchart of a measurement method according to an embodiment of this application.

The following describes a second measurement method used for the terminal in connected mode. As shown in FIG. 6, the method includes the following steps.

Step 601: The terminal receives, from a network device, information indicating a first threshold or a second threshold.

In this embodiment of this application, the network device may be a base station serving a cell on which the terminal currently camps, and the terminal is in connected mode, that is, the terminal has established a communication connection to the base station serving the currently camped cell. In this case, the base station may send, to the terminal, the information indicating the first threshold or the second threshold. Correspondingly, the terminal may receive the information that is sent by the base station and that indicates the first threshold or the second threshold. In addition, this step is an optional step, and the first threshold and/or the second threshold may be preconfigured in the terminal.

Step 602: If a variation $\Delta S$ of a cell state variable is greater than or equal to the first threshold, determine whether duration $\Delta t_{\Delta S}$ for reaching $\Delta S$ is less than or equal to the second threshold.

For a specific implementation of this step, refer to step 402. Details are not described herein again in this embodiment of this application.

Step 603: Measure signal quality RSRQ or signal power RSRP of one or more first cells in one or more neighboring cells of the currently camped cell if $\Delta t_{\Delta S}$ is less than or equal to the second threshold.

It should be noted that the first cell may be a cell that is in the neighboring cells and that has a frequency the same as or different from that of the currently camped cell.

Optionally, when a cell state changes relatively drastically, to hand over the terminal to a cell with a relatively large coverage area as much as possible, the first cell may alternatively be a cell that is in the neighboring cells and whose coverage area is larger than a coverage area of the currently camped cell.

For a specific implementation of this step, refer to step 403. Details are not described herein again in this embodiment of this application.

Step 604: The terminal sends a measurement report to the base station, where the measurement report includes signal quality RSRQ or signal power RSRP of each of the one or more first cells.

For this step, refer to the specific implementation in step 504 in the foregoing embodiment. Details are not described herein again in this embodiment of this application.

Step 605: When receiving the measurement report sent by the terminal, the base station determines a second cell based on the signal quality or the signal power that is of each of the one or more first cells and that is included in the measurement report, and sends a first message to the terminal, where the first message is used to indicate the terminal to hand over to the second cell, and the second cell is one of the one or more first cells.

For a specific implementation process of this step, refer to the related implementation in step 505 in the foregoing embodiment. Details are not described herein again in this embodiment of this application.

In addition, when performing cell handover, the base station may consider many factors. Sometimes, the base station may not perform cell handover merely by using the measurement report reported by the terminal. Therefore, this step is an optional step.

Step 606: The terminal receives the first message from the base station, and is handed over to the second cell based on the first message.

In this embodiment of this application, the terminal may determine whether the variation ΔS of the cell state variable is greater than or equal to the first threshold. If ΔS is greater than or equal to the first threshold, the terminal may further determine whether the duration for reaching ΔS is less than or equal to the second threshold. If the duration is less than or equal to the second threshold, it indicates that the cell state changes greatly in a relatively short time. In this case, the terminal may start measurement on the neighboring cells. Then, the terminal may send the measurement report to the base station based on the measured signal quality or signal power of the one or more first cells, so that the base station sends, based on the measurement report, the first message used to indicate the terminal to hand over to the second cell, where the second cell is one of the one or more first cells. That is, when a signal of the cell on which the terminal in connected mode currently camps changes relatively drastically, or when the terminal is handed over to a cell relatively frequently, the terminal measures the signal quality or the signal power of the neighboring cells and reports the signal quality or the signal power to the base station. Compared with the prior art in which the terminal measures signal quality or signal power of a neighboring cell and reports the signal quality or the signal power to the base station when a cell signal changes relatively greatly, in this application, a quantity of measurements and a quantity of times for which the terminal reports the signal quality or the signal power to the base station are reduced, and signaling overheads are reduced. Further, in this application, the terminal may directly measure signal quality of a first cell with a relatively large coverage area, and report the signal quality to the base station. In this way, the base station can directly hand over the terminal to the cell with the relatively large coverage area based on the reported signal quality. Therefore, when the terminal moves, signal quality does not change drastically due to a relatively small moving distance. Further, cell measurement or handover is not performed frequently. In this way, quantities of times of cell measurement and handover performed by the terminal are reduced, and power consumption of the terminal is reduced. In addition, a quantity of times of reporting the signal quality by the terminal is reduced, thereby reducing signaling overheads.

In the foregoing embodiments, several implementations in which the terminals in different states each measure the neighboring cells and reselect the cell are described. Next, several implementations of starting measurement on the neighboring cells by the terminal, that is, several conditions or occasions for starting measurement by the terminal, are described in detail in the following embodiments.

First Implementation:

The currently camped cell is measured in Δt, to obtain $\{S_i | i \text{ is a positive integer}, i \leq N\}$, where N is the total quantity of times of measuring the currently camped cell in Δt, and $S_i$ is the cell state variable obtained through the $i^{th}$ measurement. If any $S_i$ in $\{S_i | i \text{ is a positive integer}, i \leq N\}$ satisfies that $S_{REF} - S_i$ is greater than or equal to the first threshold, $S_{REF}$ is updated so that $S_{REF}$ is equal to $S_N$, where $S_{REF}$ is the cell state reference variable of the currently camped cell. The neighboring cells of the currently camped cell are measured if $S_{REF} - S_i$ is greater than or equal to the first threshold.

In this implementation, the terminal may start to measure the currently camped cell at the moment at which the terminal camps on the currently camped cell, and determine the measured cell state variable as $S_{REF}$. The terminal continuously measures the currently camped cell in the time period Δt, to obtain $\{S_i | i \text{ is a positive integer}, i \leq N\}$. The terminal may calculate $S_{REF} - S_i$ each time $S_i$ is obtained through measurement, and determine whether $S_{REF} - S_i$ is greater than or equal to the first threshold. Alternatively, the terminal may calculate $S_i - S_{REF}$, and determine whether $S_i - S_{REF}$ is less than or equal to the first threshold. In other words, in this application, an expression A–B may be replaced with B–A. If all $S_i$ obtained through measurement in Δt meets the foregoing condition, it indicates that the signal of the currently camped cell deteriorates in Δt. In this case, the terminal may update $S_{REF}$ when Δt ends, so that $S_{REF}$ is equal to a value $S_N$ obtained through the last measurement in Δt. In addition, the terminal starts measurement on the neighboring cells, so that the terminal can reselect or is handed over to a cell with better signal quality.

Optionally, in a possible case, alternatively, $S_{REF}$ may be signal quality or signal power that is of the currently camped cell and that is measured by the terminal at another moment. Alternatively, a cell state variable, of the currently camped cell, obtained through the latest (or latest) measurement performed before the moment at which the terminal camps on the currently camped cell is determined as $S_{REF}$. This is not specifically limited in the embodiments of this application.

Optionally, a moment at which the terminal obtains $S_N$ through measurement may be a current moment (Current), and $S_N$ is a current cell state variable or a cell state variable obtained through the latest measurement.

The currently camped cell may also be referred to as a serving cell (Serving Cell), and the cell state reference variable is a cell state variable used for reference (Reference) or a reference value of the cell state variable. The measuring the neighboring cells of the currently camped cell further includes intra-frequency and/or inter-frequency measurement.

It should be noted that the foregoing explanations about $S_{REF}$, $S_N$, and the currently camped cell are also applicable to $S_{REF}$, $S_N$, and the currently camped cell in other implementations in the embodiments of this application.

In this implementation, when determining that the cell state variable in Δt is always less than the cell state reference variable, the terminal may start measurement on the neighboring cells, and update the cell state variable from $S_{REF}$ to the cell state variable $S_N$ obtained through the last measurement in Δt. In this way, if the terminal fails to reselect to another cell after measuring the neighboring cells, the terminal may determine again, based on $S_{REF}$ obtained after the update, whether the cell state variable of the currently camped cell in Δt meets a condition, to determine whether to start measurement on the neighboring cells again. Compared with a case in which the terminal continuously measures the neighboring cells, this application reduces a quantity of times of measuring the neighboring cells by the terminal, and reduces power consumption of the terminal.

Second Implementation:

The current cell state variable $S_{current}$ is obtained by measuring the currently camped cell. If $S_{current}-S_{REF}$ is greater than or equal to the second threshold, $S_{REF}$ is updated so that $S_{REF}$ is equal to $S_{current}$, where $S_{REF}$ is the cell state reference variable of the currently camped cell. A neighboring cell of the currently camped cell is measured if $S_{REF}-S_{current}$ is greater than or equal to the first threshold.

In this implementation, each time after measuring the cell state variable, the terminal may compare the measured cell state variable $S_{current}$ with the cell state reference variable $S_{REF}$ of the currently camped cell. If $S_{current}-S_{REF}$ is greater than or equal to the second threshold, it indicates that an increment of the cell state variable has reached the second threshold up to now. In other words, the signal power or signal quality of the currently camped cell does not deteriorate. In this case, the terminal may not need to measure the neighboring cells, but updates the cell state variable from $S_{REF}$ to $S_{current}$, further continues to measure the cell state variable of the currently camped cell, and compares the cell state variable with the updated $S_{REF}$. In this way, when the signal quality or the signal power of the currently camped cell deteriorates, measurement on the neighboring cells is started in time.

Optionally, if $S_{REF}-S_{current}$ is greater than or equal to the first threshold, it indicates that a decrement of the cell state variable of the currently camped cell has reached the first threshold by the current moment. In other words, a signal of the currently camped cell deteriorates relatively greatly. In this case, the terminal may start measurement on the neighboring cells of the currently camped cell, so that the terminal can reselect or is handed over to a cell based on the measurement result.

The current cell state variable $S_{current}$ is a cell state variable at the current (Current) moment, a current value of the cell state variable, a latest value of the cell state variable, or a latest measured value of the cell state variable.

In this implementation, the terminal may compare the measured cell state variable with the cell state reference variable in real time, and start measurement on the neighboring cells in time when the variation of the cell state variable reaches a threshold. In this way, the terminal can perform cell reselection or handover in a more timely manner when a cell signal deteriorates.

Third Implementation:

The currently camped cell is measured in Δt, to obtain $\{S_i | i$ is a positive integer, $i \leq N\}$, where N is the total quantity of times of measuring the currently camped cell in Δt, and $S_i$ is the cell state variable obtained through the $i^{th}$ measurement. $S_{REF}$ is updated so that $S_{REF}$ is equal to the maximum value in $\{S_i | i$ is a positive integer, $i \leq N\}$ or is equal to the average value of $\{S_i | i$ is a positive integer, $i \leq N\}$, where $S_{REF}$ is the cell state reference variable of the currently camped cell. The neighboring cells of the currently camped cell are measured if $S_{REF}-S_i$ is greater than or equal to the first threshold.

In this implementation, the terminal may measure the cell state variable $S_{REF}$ of the currently camped cell when the terminal camps on the currently camped cell. The terminal continuously measures the currently camped cell in the time period Δt, to obtain $\{S_i | i$ is a positive integer, $i \leq N\}$. The terminal stores N $S_i$s. Each time the terminal obtains new $S_i$ (denoted as $S_{N+1}$) through measurement, the terminal may replace $\{S_1, S_2, S_3 \ldots S_{N-1}, S_N\}$ currently stored by the terminal with $\{S_2, S_3 \ldots S_{N-1}, S_N, S_{N+1}\}$ to obtain new $\{S_1, S_2, S_3 \ldots S_{N-1}, S_N\}$, and then update the cell state variable from $S_{REF}$ to a maximum value in updated $\{S_i | i$ is a positive integer, $i \leq N\}$ or to an average value of updated $\{S_i | i$ is a positive integer, $i \leq N\}$. In addition, the terminal may further calculate $S_{REF}-S_i$. If any $S_i$ in $\{S_i | i$ is a positive integer, $i \leq N\}$ meets that $S_{REF}-S_i$ is greater than or equal to the first threshold, the signal quality of the currently camped cell continuously deteriorates. In this case, the terminal may start measurement on the neighboring cells of the currently camped cell, so that the terminal can reselect to a better cell to camp on.

It should be noted that, in the embodiments of this application, after starting measurement on the neighboring cells in any one of the foregoing manners, the terminal may measure the signal quality or the signal power of the neighboring cells with reference to the related manner of measuring the neighboring cells described in the foregoing embodiments, and perform cell reselection or handover based on the measured signal quality or signal power of the neighboring cells in the cell reselection or handover manner described in the foregoing embodiments. Details are not described herein again in the embodiments of this application.

Figure 7:
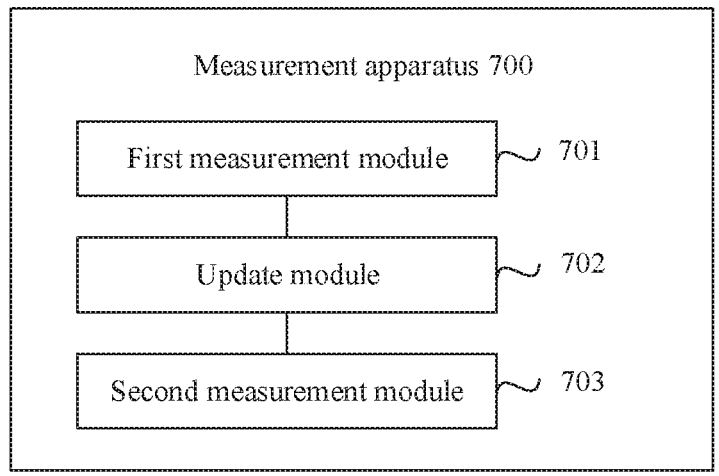
FIG. 7 is a block diagram of a measurement apparatus according to an embodiment of this application.

FIG. 7 is a block diagram of a cell reselection apparatus according to an embodiment of this application. The apparatus is applied to a terminal. As shown in FIG. 7, the apparatus 700 includes a first measurement module 701, an update module 702, and a second measurement module 703.

The first measurement module 701 is configured to measure a currently camped cell in Δt, to obtain $\{S_i | i$ is a positive integer, $i \leq N\}$, where N is a total quantity of times of measuring the currently camped cell in Δt, and $S_i$ is a cell state variable obtained through the $i^{th}$ measurement.

The update module 702 is configured to: if any $S_i$ in $\{S_i | i$ is a positive integer, $i \leq N\}$ satisfies that $S_{REF}-S_i$ is greater than or equal to a first threshold, update $S_{REF}$ so that $S_{REF}$ is equal to $S_N$, where $S_{REF}$ is a cell state reference variable of the currently camped cell.

The second measurement module 703 is configured to measure one or more neighboring cells of the currently camped cell if $S_{REF}-S_i$ is greater than or equal to a first threshold.

Optionally, the apparatus further includes:

a receiving module, configured to receive, from a network device, information used to indicate Δt or information used to indicate the first threshold.

Optionally, the apparatus further includes:

an obtaining module, configured to obtain $S_{REF}$ after the currently camped cell is reselected to or selected to.

Optionally, the cell state variable includes signal power RSRP or signal quality RSRQ.

Optionally, a coverage area of each of one or more cells in the neighboring cells is larger than a coverage area of the currently camped cell.

Optionally, the apparatus further includes:

a reselection module, configured to: if a first cell in the neighboring cells meets a cell reselection condition, reselect to the first cell.

Optionally, the apparatus further includes:

a sending module, configured to send a measurement report to the network device, where the measurement report includes signal quality RSRQ or signal power RSRP of each of the one or more cells.

Optionally, if a priority of a frequency of each of the one or more cells is lower than a priority of a frequency of the currently camped cell, the coverage area of each of the one or more cells is larger than the coverage area of the currently camped cell; or if a priority of each of the one or more cells is lower than a priority of the currently camped cell, the coverage area of each of the one or more cells is larger than the coverage area of the currently camped cell; or if a frequency of each of the one or more cells is lower than a frequency of the currently camped cell, the coverage area of each of the one or more cells is larger than the coverage area of the currently camped cell; or if a cell type of each of the one or more cells is a macro cell, and a cell type of the currently camped cell is a micro cell, the coverage area of each of the one or more cells is larger than the coverage area of the currently camped cell.

Figure 8:
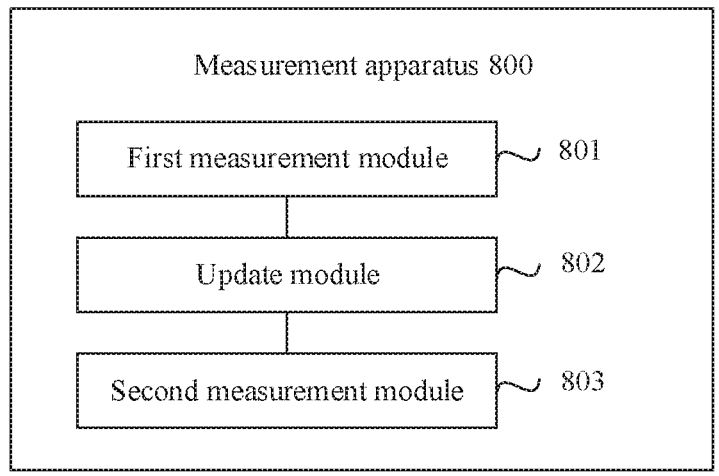
FIG. 8 is a block diagram of another measurement apparatus according to an embodiment of this application.

FIG. 8 is a block diagram of a cell reselection apparatus according to an embodiment of this application. The apparatus is applied to a terminal. As shown in FIG. 8, the apparatus 800 includes a first measurement module 801, an update module 802, and a second measurement module 803.

The first measurement module 801 is configured to measure a currently camped cell to obtain a current cell state variable $S_{current}$.

The update module 802 is configured to: if $S_{current}-S_{REF}$ is greater than or equal to a second threshold, update $S_{REF}$ so that $S_{REF}$ is equal to $S_{current}$, where $S_{REF}$ is a cell state reference variable of the currently camped cell.

The second measurement module 803 is configured to: measure one or more neighboring cells of the currently camped cell if $S_{REF}-S_{current}$ is greater than or equal to a first threshold.

Optionally, the apparatus further includes:
a receiving module, configured to receive, from a network device, information used to indicate the first threshold, or information used to indicate the second threshold.

Optionally, the apparatus further includes:
an obtaining module, configured to obtain $S_{REF}$ after the currently camped cell is reselected to or selected to.

Optionally, the cell state variable includes signal power RSRP or signal quality RSRQ.

Optionally, a coverage area of each of one or more cells in the neighboring cells is larger than a coverage area of the currently camped cell.

Optionally, the apparatus further includes:
a reselection module, configured to: if a first cell in the neighboring cells meets a cell reselection condition, reselect to the first cell.

Optionally, the apparatus further includes:
a sending module, configured to send a measurement report to the network device, where the measurement report includes signal quality RSRQ or signal power RSRP of each of the one or more cells.

Optionally, if a priority of a frequency of each of the one or more cells is lower than a priority of a frequency of the currently camped cell, the coverage area of each of the one or more cells is larger than the coverage area of the currently camped cell; or if a priority of each of the one or more cells is lower than a priority of the currently camped cell, the coverage area of each of the one or more cells is larger than the coverage area of the currently camped cell; or if a frequency of each of the one or more cells is lower than a frequency of the currently camped cell, the coverage area of each of the one or more cells is larger than the coverage area of the currently camped cell; or if a cell type of each of the one or more cells is a macro cell, and a cell type of the currently camped cell is a micro cell, the coverage area of each of the one or more cells is larger than the coverage area of the currently camped cell.

Figure 9:
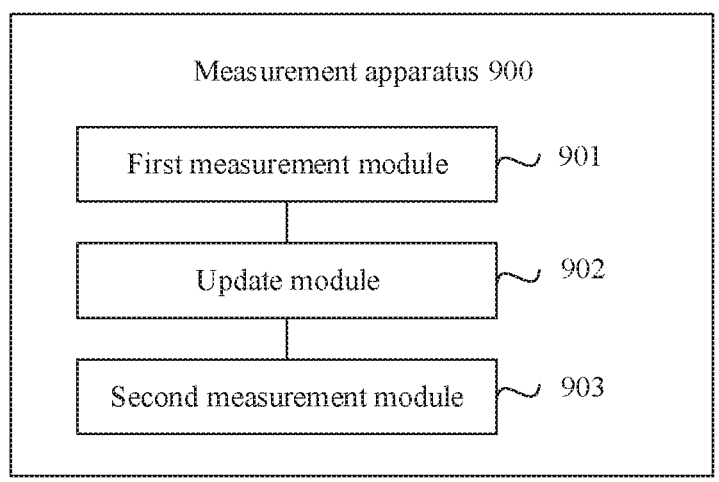
FIG. 9 is a block diagram of another measurement apparatus according to an embodiment of this application.

FIG. 9 is a block diagram of a cell reselection apparatus according to an embodiment of this application. The apparatus is applied to a terminal. As shown in FIG. 9, the apparatus 900 includes a first measurement module 901, an update module 902, and a second measurement module 903.

The first measurement module 901 is configured to measure a currently camped cell in $\Delta t$, to obtain $\{S_i | i$ is a positive integer, $i \leq N\}$, where N is a total quantity of times of measuring the currently camped cell in $\Delta t$, and $S_i$ is a cell state variable obtained through the $i^{th}$ measurement.

The update module 902 is configured to update $S_{REF}$ so that $S_{REF}$ is equal to a maximum value in $\{S_i | i$ is a positive integer, $i \leq N\}$ or is equal to an average value of $\{S_i | i$ is a positive integer, $i \leq N\}$, where $S_{REF}$ is a cell state reference variable of the currently camped cell.

The second measurement module 903 is configured to: measure one or more neighboring cells of the currently camped cell if $S_{REF}-S_i$ is greater than or equal to a first threshold.

Optionally, the apparatus further includes:
a receiving module, configured to receive, from a network device, information used to indicate $\Delta t$ or information used to indicate the first threshold.

Optionally, the apparatus further includes:
an obtaining module, configured to obtain $S_{REF}$ after the currently camped cell is reselected to or selected to.

Optionally, the cell state variable includes signal power RSRP or signal quality RSRQ.

Optionally, a coverage area of each of one or more cells in the neighboring cells is larger than a coverage area of the currently camped cell.

Optionally, the apparatus further includes:
a reselection module, configured to: if a first cell in the neighboring cells meets a cell reselection condition, reselect to the first cell.

Optionally, the apparatus further includes:
a sending module, configured to send a measurement report to the network device, where the measurement report includes signal quality RSRQ or signal power RSRP of each of the one or more cells.

Optionally, if a priority of a frequency of each of the one or more cells is lower than a priority of a frequency of the currently camped cell, the coverage area of each of the one or more cells is larger than the coverage area of the currently camped cell; or if a priority of each of the one or more cells is lower than a priority of the currently camped cell, the coverage area of each of the one or more cells is larger than the coverage area of the currently camped cell; or if a frequency of each of the one or more cells is lower than a frequency of the currently camped cell, the coverage area of each of the one or more cells is larger than the coverage area of the currently camped cell; or if a cell type of each of the one or more cells is a macro cell, and a cell type of the currently camped cell is a micro cell, the coverage area of each of the one or more cells is larger than the coverage area of the currently camped cell.

To implement the methods in the foregoing embodiments, an embodiment of this application further provides a corresponding communications apparatus.

In an optional design, for a structure of the communications apparatus, refer to FIG. 2 and related descriptions.

In another optional design, the communications apparatus may include a processor, or may further include a memory. The processor is configured to: couple to the memory, and read and execute an instruction in the memory, to implement the methods in the foregoing embodiments.

When the measurement apparatuses provided in the foregoing embodiments perform cell measurement, division into the foregoing function modules is merely used as an example for illustration. In actual application, the foregoing functions may be allocated to different function modules and implemented based on a requirement. That is, an inner structure of a device is divided into different function modules to complete all or some of the functions described above. In addition, the measurement apparatuses provided in the foregoing embodiments are based on a same inventive concept as the measurement methods in the foregoing embodiments. For a specific implementation process, refer to the method embodiments, and details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD), a semiconductor medium (for example, a solid-state drive (Solid State Disk, SSD)), or the like.

That is, in the embodiments of this application, a computer-readable storage medium is provided. When the computer-readable storage medium runs on a computer, the computer is enabled to perform the steps of the measurement methods provided in the foregoing embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are embodiments of this application, but are not intended to limit this application. Any modification, equivalent replacement, improvement, or the like made without departing from the spirit and principle of this application should fall within the protection scope of this application.

What is claimed is:

1. A measurement method, wherein the method comprises:
   receiving, by a terminal and from a network device, information that indicates a time period $\Delta t$;
   obtaining, by the terminal, $S_{REF}$ after reselecting or selecting to a currently camped cell, wherein $S_{REF}$ is a current cell state variable of the currently camped cell;
   after obtaining $S_{REF}$, performing, by the terminal, a plurality of measurements of the currently camped cell in the time period $\Delta t$, wherein a respective cell state variable is obtained in each of the plurality of measurements; and
   in response to a satisfaction of a condition that $S_{REF}$ is greater than each of the cell state variables obtained in the plurality of measurements by at least a first threshold, performing, by the terminal, following operations:
      updating $S_{REF}$ to a cell state variable of the currently camped cell that is obtained through a last measurement of the plurality of measurements; and
      measuring one or more neighboring cells of the currently camped cell.

2. The method according to claim 1, wherein the cell state variable comprises reference signal received power (RSRP) or reference signal received quality (RSRQ).

3. The method according to claim 1, wherein a coverage area of each of the one or more neighboring cells is larger than a coverage area of the currently camped cell.

4. The method according to claim 3, further comprising:
   when a first cell in the one or more neighboring cells meets a cell reselection condition, reselecting to the first cell.

5. The method according to claim 3, further comprising:
   sending a measurement report to a network device, wherein the measurement report comprises RSRQ or RSRP of each of the one or more neighboring cells.

6. The method according to claim 3, wherein
   when a priority of a frequency of each of the one or more neighboring cells is lower than a priority of a frequency of the currently camped cell, the coverage area of each of the one or more neighboring cells is larger than the coverage area of the currently camped cell.

7. A communications apparatus, comprising:
   at least one processor; and
   a non-transitory computer readable storage medium storing programming instructions for execution by the at least one processor to cause the apparatus to perform operations comprising:
   receiving, from a network device, information that indicates a time period $\Delta t$;
   obtaining $S_{REF}$ after reselecting or selecting to a currently camped cell, wherein $S_{REF}$ is a current cell state variable of the currently camped cell;
   after obtaining $S_{REF}$, performing a plurality of measurements of the currently camped cell in the time period $\Delta t$, wherein a respective cell state variable is obtained in each of the plurality of measurements; and
   in response to a satisfaction of a condition that $S_{REF}$ is greater than each of the cell state variables obtained in the plurality of measurements by at least a first threshold, performing the following operations:
      updating $S_{REF}$ to a cell state variable of the currently camped cell that is obtained through a last measurement of the plurality of measurements; and
      measuring one or more neighboring cells of the currently camped cell.

8. The apparatus according to claim 7, wherein the cell state variable comprises reference signal received power (RSRP) or reference signal received quality (RSRQ).

9. The apparatus according to claim 7, wherein a coverage area of each of the one or more neighboring cells is larger than a coverage area of the currently camped cell.

10. The apparatus according to claim 9, wherein the operations further comprise:
when a first cell in the one or more neighboring cells meets a cell reselection condition, reselecting to the first cell.

11. The apparatus according to claim 9, wherein the operations further comprise:
sending a measurement report to a network device, wherein the measurement report comprises RSRQ or RSRP of each of the one or more neighboring cells.

12. The apparatus according to claim 9, wherein
when a priority of a frequency of each of the one or more neighboring cells is lower than a priority of a frequency of the currently camped cell, the coverage area of each of the one or more neighboring cells is larger than the coverage area of the currently camped cell.

13. A non-transitory computer readable storage medium storing programming for execution by at least one processor, the programming including instructions to perform operations comprising:
receiving, by a terminal and from a network device, information that indicates a time period $\Delta t$;
obtaining, by the terminal, $S_{REF}$ after reselecting or selecting to a currently camped cell, wherein
$S_{REF}$ is a current cell state variable of the currently camped cell;
after obtaining $S_{REF}$, performing, by the terminal, a plurality of measurements of the currently camped cell in the time period $\Delta t$, wherein a respective cell state variable is obtained in each of the plurality of measurements; and
in response to a satisfaction of a condition that $S_{REF}$ is greater than each of the cell state variables obtained in the plurality of measurements by at least a first threshold, performing, by the terminal, following operations:
updating $S_{REF}$ to a cell state variable of the currently camped cell that is obtained through a last measurement of the plurality of measurements; and
measuring one or more neighboring cells of the currently camped cell.

14. The computer readable storage medium according to claim 13, wherein the cell state variable comprises reference signal received power (RSRP) or reference signal received quality (RSRQ).

* * * * *

UNITED STATES PATENT AND TRADEMARK OFFICE
CERTIFICATE OF CORRECTION

PATENT NO. : 11,503,484 B2
APPLICATION NO. : 16/991297
DATED : November 15, 2022
INVENTOR(S) : Hong Wang, Jian Zhang and Li Chai It is certified that error appears in the above-identified patent and that said Letters Patent is hereby corrected as shown below:

On the Title Page

Column 2 (Abstract), Line 5, After "Si" insert -- is --.

Signed and Sealed this
Fourth Day of April, 2023

Katherine Kelly Vidal
*Director of the United States Patent and Trademark Office*